United States Patent
Reber et al.

(10) Patent No.: US 11,206,327 B2
(45) Date of Patent: Dec. 21, 2021

(54) SYSTEMS AND METHODS OF LIVE STREAMING EMERGENCY DISPATCH DATA TO FIRST RESPONDERS

(71) Applicant: HigherGround, Inc., Canoga Park, CA (US)

(72) Inventors: William F. Reber, Alpine, CA (US); Rajesh ChandraMohan Garg, North Hollywood, CA (US); Samuel Hood Smith, Reseda, CA (US); Thomas W. Goodwin, III, Coronado, CA (US)

(73) Assignee: HIGHERGROUND, INC., Canoga Park, CA (US)

(*) Notice: Subject to any disclaimer, the term of this patent is extended or adjusted under 35 U.S.C. 154(b) by 0 days.

(21) Appl. No.: 17/096,194

(22) Filed: Nov. 12, 2020

(65) Prior Publication Data
US 2021/0152687 A1    May 20, 2021

Related U.S. Application Data

(60) Provisional application No. 62/935,499, filed on Nov. 14, 2019.

(51) Int. Cl.
*H04M 1/725* (2021.01)
*G10L 25/48* (2013.01)
(Continued)

(52) U.S. Cl.
CPC ......... *H04M 1/72421* (2021.01); *G10L 25/48* (2013.01); *H04M 3/4365* (2013.01);
(Continued)

(58) Field of Classification Search
CPC ........... H04M 1/72421; H04M 3/4365; H04M 3/5231; H04M 3/5116; H04M 2250/10;
(Continued)

(56) References Cited

U.S. PATENT DOCUMENTS

| 8,976,939 B1* | 3/2015 | Hamilton | H04M 3/5116 379/45 |
| 2011/0281547 A1* | 11/2011 | Cordero | G08B 27/001 455/404.1 |
| 2014/0295786 A1 | 10/2014 | Maier et al. | |
| 2014/0368601 A1* | 12/2014 | deCharms | H04L 67/26 348/14.02 |
| 2016/0148490 A1* | 5/2016 | Barnes | H04W 4/90 455/404.1 |

(Continued)

OTHER PUBLICATIONS

International Search Report and Written Opinion for PCT/US20/60162, dated Feb. 2, 2021.

(Continued)

*Primary Examiner* — Minjung Kim
(74) *Attorney, Agent, or Firm* — Concept IP LLP; Michael Zarrabian

(57) ABSTRACT

Systems, devices, and methods including: capturing, by a capture device, an audio and corresponding location metadata associated with an emergency call; refining the location metadata to provide a refined location metadata; correlating, by the capture device, the refined location metadata of the emergency call with a geofenced location of the computing devices of one or more first responders (FRs); screening, by the capture device or the computing device, the emergency call data; transmitting, by the capture device, a first signal to the one or more computing devices based on the correlation, the transmitted signal including a portion of the captured audio and corresponding location metadata; receiving, by the capture device, an accept signal from the one or more computing devices of one or more FRs; transmitting, by the capture device, a second signal to the one or more computing devices based on the received accept signal.

20 Claims, 16 Drawing Sheets

(51) Int. Cl.
  *H04W 4/021* (2018.01)
  *H04M 3/436* (2006.01)
  *H04W 4/90* (2018.01)
  *H04M 3/523* (2006.01)
  *H04M 3/51* (2006.01)
  *H04M 1/72421* (2021.01)

(52) U.S. Cl.
  CPC ....... *H04M 3/5116* (2013.01); *H04M 3/5231* (2013.01); *H04W 4/021* (2013.01); *H04W 4/90* (2018.02); *H04M 2250/10* (2013.01); *H04M 2250/12* (2013.01)

(58) Field of Classification Search
  CPC ... H04M 2250/12; H04W 4/90; H04W 4/021; G10L 25/48
  See application file for complete search history.

(56) References Cited

U.S. PATENT DOCUMENTS

| | | | |
|---|---|---|---|
| 2018/0327091 A1* | 11/2018 | Burks | B64C 39/10 |
| 2019/0253861 A1* | 8/2019 | Horelik | H04W 76/50 |
| 2019/0320310 A1 | 10/2019 | Horelik et al. | |
| 2019/0335308 A1 | 10/2019 | Patton et al. | |

OTHER PUBLICATIONS

Reber, William; Closing the 9-1-1 Gap: How Streaming 9-1-1 Audio Can Transform Emergency Police Response; Police Chief Magazine; available at: https://www.policechiefmagazine.org/closing-the-9-1-1-gap-how-streaming-9-1-1-audio-can-transform-emergency-police-response/; Jan. 25, 2017.

* cited by examiner

SYSTEMS AND METHODS OF LIVE STREAMING EMERGENCY DISPATCH DATA TO FIRST RESPONDERS

CROSS-REFERENCE TO RELATED APPLICATIONS

This application claims priority to and the benefit of U.S. Provisional Patent Application No. 62/935,499, filed Nov. 14, 2019, the contents of which are hereby incorporated by reference herein for all purposes.

TECHNICAL FIELD

The present embodiments relate generally to relaying information to first responders (FRs), and more particularly to live streaming emergency call data to FRs.

BACKGROUND

A Public Safety Answering Point (PSAP) is a call center where emergency calls are received from distressed users. A worker at the call center who receives an emergency call is known as a call-taker. The job of a call-taker is to receive the emergency call, and quickly identify the caller's situation and location among other things and input this information into a CAD (Computer Aided Dispatch) system. Another worker at the call center is known as a dispatcher. The dispatcher reads the information entered the CAD system by the call-taker, and then broadcasts the call (over police radio) to an officer or field security personnel who is best suited to respond to the emergency of the caller. The call-taker and/or the dispatcher may need to make several decisions in a short time span, to be able to get the best match of the field security personnel directed to the caller. These field security personnel are known as First Responders (FRs). Generally, when an emergency call is received on the PSAP, the caller may be in urgent need of help. For example, if there is an accident situation or a medical emergency. And in such cases, the response time by the PSAP and the FRs is a crucial factor in saving lives.

SUMMARY

A method embodiment may include: capturing, by at least one capture device, an audio and corresponding location metadata associated with an emergency call; refining, by at least one capture device, the location metadata to provide a refined location metadata. The refined location metadata may be more precise and may be retrieved by means of additional queries to a RapidSOS®-like data clearinghouse, and more precise street address by means of additional queries to an ArcGIS®-like geocoding service. The method further includes correlating, by the at least one capture device, the refined location metadata of the emergency call with a geofenced location of one or more computing devices of one or more first responders (FRs); transmitting, by the at least one capture device, a first signal to the one or more computing devices of one or more FRs based on the correlation, wherein the transmitted signal comprises at least a portion of the captured audio and the corresponding location metadata; screening, by at least one of the at least one capture device and the at least one computing device, the emergency call metadata, wherein screening the emergency call metadata further comprises filtering the emergency call metadata to select only emergency calls of interest or relevance to the one or more computing devices of one or more FRs, thereby reducing distractions and cognitive load experienced by the FRs. The method further comprises receiving, by the at least one capture device, an accept signal from the one or more computing devices of one or more FRs based on the screening; and transmitting, by the at least one capture device, a second signal to the one or more computing devices of one or more FRs based on the received accept signal, wherein the second signal comprises emergency response data, Automatic Location Identification (ALI) data, global positioning system (GPS) data or a combination thereof related to the captured audio and the corresponding refined location metadata.

Additional method embodiments may include measuring, by the one or more computing devices of one or more FRs the actual time spent in monitoring of the emergency call by the one or more computing devices of one or more FRs and transmitting this measurement to the at least one capture device for reporting and statistical analysis.

Additional method embodiments may include correlating further comprising determining, by the at least one capture device, that the refined location metadata of the emergency call is within the geofenced location of one or more computing devices of one or more first responders (FRs).

Additional method embodiments may include: correlating further comprising determining, by the at least one capture device, that the location metadata of the emergency call is within a predetermined distance threshold from the geofenced location of one or more computing devices of one or more first responders (FRs).

Additional method embodiments may include: receiving, by the one or more computing devices of the one or more FRs the first signal and sending, by the one or more computing devices of the one or more FRs, the accept signal to the capture device.

Additional method embodiments may include: monitoring duplicate calls associated with the emergency call.

Additional method embodiments may include: displaying, on a graphical user interface (GUI) of the one or more computing devices of the one or more FRs, one or more maps comprising at least one of a location history associated with the emergency call and a current location associated with the emergency call.

Additional method embodiments may include: providing, by a drone device, a geofencing range associated with the geofenced location of one or more computing devices of one or more first responders (FRs).

Additional method embodiments may include: determining the location associated with the emergency call based on the GPS location associated with a callback to the emergency number.

Additional method embodiments may include: determining, by the at least one capture device, that the refined location metadata of the emergency call is within a predetermined distance threshold from the geofenced location of one or more computing devices of one or more first responders (FRs) for the correlation.

An apparatus embodiment may include: an apparatus comprising: at least one memory; at least one processor configured to execute instructions stored in the at least one memory in order to: capture, by at least one capture device, an audio and corresponding location metadata associated with an emergency call; refine, by at least one capture device, the location metadata to provide a refined location metadata, wherein the refined location metadata comprises one or more street addresses; correlate, by the at least one capture device, the refined location metadata of the emergency call with a geofenced location of one or more computing devices of one or more first responders (FRs); transmit, by the at least one capture device, a first signal to the one or more computing devices of one or more FRs based on the correlation, wherein the transmitted signal comprises at least a portion of the captured audio and corresponding refined location metadata; screen, by at least of the at least one capture device and the at least one computing device, the emergency call metadata, wherein screening comprises filtering the emergency call metadata to select only emergency calls of interest or relevance to the one or more computing devices of one or more FRs; receive, by the at least one capture device, an accept signal from the one or more computing devices of one or more FRs based on the screening; and transmit, by the at least one capture device, a second signal to the one or more computing devices of one or more FRs based on the received accept signal, wherein the second signal comprises at least one of: emergency response data, Automatic Location Identification (ALI) data, global positioning system (GPS) data relating to the captured audio, or a combination thereof and corresponding refined location metadata.

According to some embodiments, a computer programmable product may be provided. The computer programmable product comprises a non-transitory computer readable medium having stored thereon computer executable instructions which when executed by one or more processors, cause the one or more processors to carry out operations, the operations comprising: capturing, by at least one capture device, an audio and corresponding location metadata associated with an emergency call; refining, by at least one capture device, the location metadata to provide a refined location metadata, wherein the refined location metadata comprises one or more street addresses; correlating, by the at least one capture device, the refined location metadata of the emergency call with a geofenced location of one or more computing devices of one or more first responders (FRs); transmitting, by the at least one capture device, a first signal to the one or more computing devices of one or more FRs based on the correlation, wherein the transmitted signal comprises at least a portion of the captured audio and corresponding refined location metadata; screening, by at least one of the at least one capture device and the at least one computing device, the emergency call metadata, wherein screening comprises filtering the emergency call metadata to select only emergency calls of interest or relevance to the one or more computing devices of one or more FRs; receiving, by the at least one capture device, an accept signal from the one or more computing devices of one or more FRs based on the screening; and transmitting, by the at least one capture device, a second signal to the one or more computing devices of one or more FRs based on the received accept signal, wherein the second signal comprises emergency response data, Automatic Location Identification (ALI) data, global positioning system (GPS) data or a combination thereof, relating to the captured audio and corresponding refined location metadata.

BRIEF DESCRIPTION OF THE DRAWINGS

The various embodiments of the present emergency response systems now will be discussed in detail with an emphasis on highlighting the advantageous features. These embodiments depict the novel and non-obvious emergency response mechanisms in accordance with systems shown in the accompanying drawings, which are for illustrative purposes only. These drawings include the following figures, in which like numerals indicate like parts.

DETAILED DESCRIPTION OF THE DRAWINGS

Figure 1:
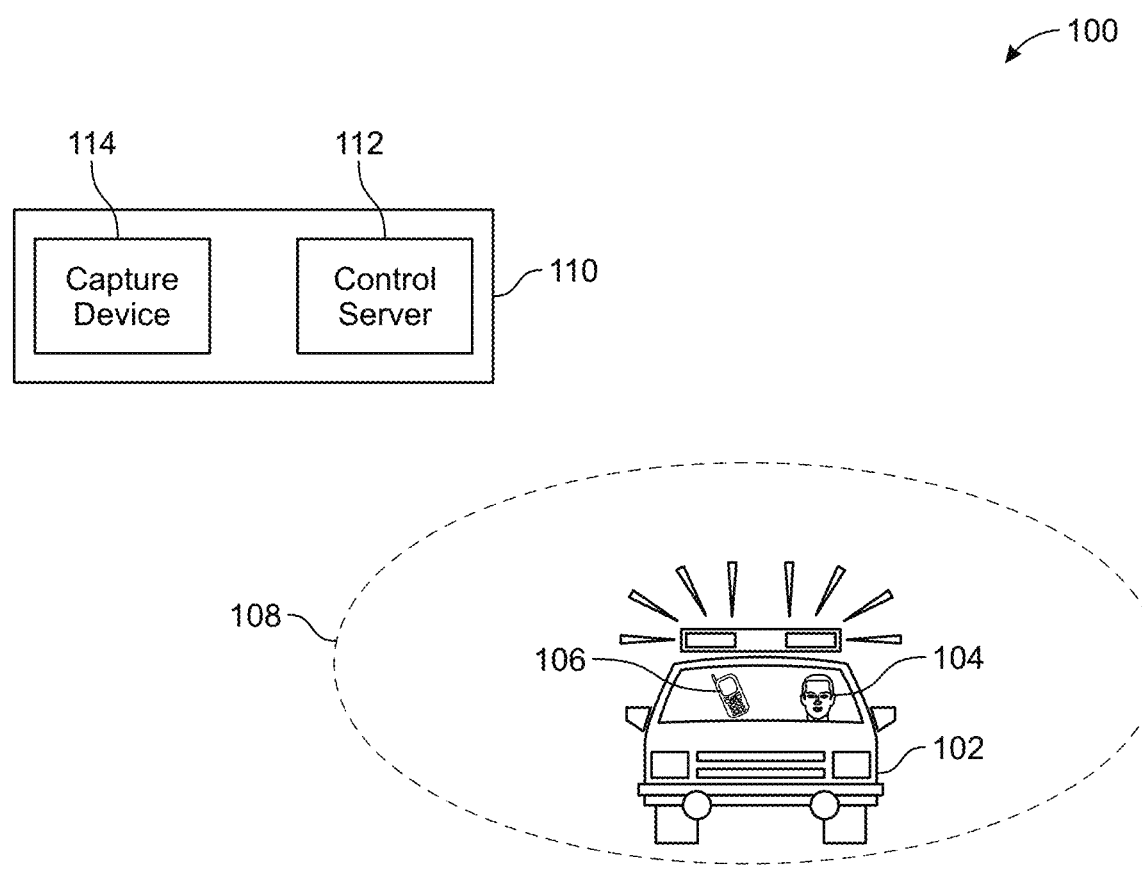
FIG. 1 illustrates a high-level block diagram of a system for transmitting emergency dispatch data to one or more first responders (FRs) in the field, in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

The described technology concerns one or more methods, systems, apparatuses, and mediums storing processor-executable process steps to live stream emergency call data to first responders (FRs) in the field. In some embodiments, an FR can listen to a 911 emergency call in real time or live by providing the FR with all the details available to the PSAP call-taker and/or the dispatcher. Furthermore, other information would become available to the FR that would otherwise be unavailable to the FR in the field, such as tone of voice, sense of urgency, background noise, and other details the that the 911 call-taker and dispatcher may not have the time or the ability to relay to FRs in the field. This accessibility of the FRs in the field to the live 911 call may provide for eliminating the delay and/or decay of critical information relating to the callers and thereby significantly improving the response times and performance of the FRs in the field when responding to emergency calls or other similar urgent situations. The improvement in response times might make a difference that is lifesaving in some situations, for example, accidents, thefts, criminal attacks, terrorist attacks, and the like.

In some embodiments, programmable circuitry programmed or configured by software and/or firmware, or entirely by special-purpose circuitry, or in a combination of such forms may be provided to implement the various methods and systems disclosed herein. Such special-purpose circuitry (if any) can be in the form of, for example, one or more application-specific integrated circuits (ASICs), programmable logic devices (PLDs), field-programmable gate arrays (FPGAs), and the like.

FIGS. 1-10 and the following description provide a brief, general description of a suitable computing environment in which various embodiments of the present invention may be implemented. Although not required, various embodiments of the present invention may be described herein in the general context of computer-executable instructions, such as routines executed by a general—or special-purpose data processing device (e.g., a server or client computer). In some embodiments, the computer-executable instructions may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the invention may be distributed over the Internet or other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

Many embodiments provide distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be in both local and remote memory storage devices. Those skilled in the relevant art will recognize that portions of the present invention may reside on a server computer, while corresponding portions may reside on a client computer (e.g., PC, mobile computer, tablet, or smart phone). In some embodiments, data structures and transmission of data particular to aspects of the invention are also encompassed within the scope of the described embodiments.

FIG. 1 illustrates a high-level block diagram of a system for transmitting emergency call data to one or more FRs in the field, in accordance with an embodiment of the invention. The emergency call data may comprise emergency call data that is live-streamed to the one or more FRs in the field. The system 100 may include an FR vehicle 102, one or more FRs 104 (also referred to as FR 104 hereinafter), and a computing device 106 associated with the FR 104. In one embodiment, the computing device 106 may be an in-vehicle device, a tablet, a laptop, or a mobile device, such as a smartphone. In one embodiment, the computing device 106 may be magnetically mounted to the dashboard of the FR vehicle 102. In another embodiment, the computing device 106 may be integrated directly into the dashboard of the FR vehicle 102.

The system 100 may further include a Public Safety Answering Point (PSAP) 110, such as a call center responsible for answering calls to an emergency telephone number, such as 911, and radio dispatching of emergency information to one or more FRs in the field. The PSAP 110 may include a capture device 114 and a control server 112. In one embodiment, a trained operator located at the PSAP 110 may be responsible for receiving and dispatching emergency services. The trained operator may be an emergency call taker responsible for taking and directing emergency calls.

The FR vehicle 102 may be located within a geofence location 108. In an embodiment, a geofence is a location-based service in which an application or other software that supports a global positioning system (GPS), Bluetooth, Wi-Fi, or cellular data may trigger a pre-programmed action when a mobile device or RFID tag enters or exits a virtual boundary set up around a geographical location, such as a virtual boundary around the FR vehicle 102. In one embodiment, the capture device 114 may configure the geofence location 108 around the FR vehicle 102 based on GPS data received from the computing device 106 at the capture device 114. In one embodiment, the geofence location 108 may be configured to allow for tracking of the FR vehicle 102.

In one embodiment, when an emergency call, such as a 911 call, is transmitted to the PSAP 110, the capture device 114 may capture the audio as well as location metadata associated with the emergency call. Further, the capture device may refine the location metadata by identifying more precise information about the location metadata. The more precise information may be identified by sending queries related to more information about location metadata to third party service providers, like RapidSOS® and ArcGIS®. For example, the by querying the third-party data clearing house like RapidSOS® and third party geocoding service like ArcGIS®, the location metadata may be refined with more rich information about street addresses. This refined location metadata further helps to increase the accuracy of service provided by the PSAP 110 and specifically the control server 112. The control server 112 may then correlate the refined incoming call information with the geofenced locations of all FRs, such as the geofence location 108 of the FR 104. The correlation may be done based on the geofenced location 108 of the computing device 106 of the FR 104, as the computing device, 106 is configured for capturing location data, such as GPS data, of the FR 104. In an embodiment, as a part of ensuring that the system does not interfere with other existing applications that the FR 104 may be using, additional capabilities may be added to a GPS proxy to allow for multiple applications to receive GPS signals from one source. The system 100 may query a local server URL hosted by the GPS proxy application which can read a more accurate location from a GPS receiver to provide the location of the FR 104 and their own geofenced location 108. The control server 112 may then direct the captured audio to an application (e.g. application 422 of FIG. 4 described below) associated with the computing device 106 of the FR 104, allowing the FR 104 to listen to the call in real-time. The control server 112 may also transmit the location metadata to a mapping function of the application associated with the computing device 106 of the FR 104. In one embodiment, the control server 112 may also transmit the location metadata to be displayed as a table on a user interface of the computing device 106 (e.g., user interface 429 described in FIG. 4 and FIG. 5).

In an embodiment, the system 100 may be configured to track usage reports associated with the use of the system 100, such as the usage data of the application 422 installed on the computing. In the usage report, the control server 112 may store a log of users using the application (e.g. application 422 of FIG. 4 described below) as a database and store it in form of a .csv file in the control server 112. In another embodiment, the file may be stored in form of any other known format such as a .pdf file, Word, or Excel. The usage report may be used later for purpose of statistical analysis such as to determine the areas or regions where the number of accident cases is high. The usage report may also be used for collecting the information related to weather or reason for accidents in some embodiments. The usage report may be used later to measure improvements in emergency response time.

In one embodiment, the usage report may also include information about actual time spent by the FR 104 or their computing device 106, in monitoring the emergency call. The monitoring may be done either by the capture device 114, or by the computing device 106, or both. This information in the usage report may be transmitted to the capture device 114, and further used for statistical analysis of call related data.

In one embodiment, if more than more one person is monitoring 911 calls at PSAP 110, then it may result in two calls from the same caller. For example, one is a training call-taker, and one is the usual call-taker or dispatcher. And in such cases, the call may be processed on more than one channel. Therefore, there is a need to filter and eliminate duplicate calls. In this case, the control server 112 may check the caller id for both the calls and consider the second call as duplicate if the caller ID for both the call are same, and thereby eliminate the duplicate call.

In an embodiment, the call-taker or dispatcher, using the system 100, at the PSAP 110 may view the location of the caller on the map for their own calls only while eliminating other calls. The dispatchers may also see the various units in the area and can make an appropriate decision on whom to dispatch the call to.

In an embodiment, the capture device 114 may screen all the incoming emergency calls and their associated metadata. The screening may be done to filter the emergency call metadata and select only emergency calls of interest or relevance to the FR 104. Thus, based on the preference set by the computing device 106 of the FR 104, only emergency call of interest may be sent to the computing device 106 of the FR 104. Such filtering helps to reduce distractions and cognitive load experienced by the FR 104.

In an embodiment, the system 100 may be configured to perform local storage of all the calling numbers from which the FR 104 received the call for a time period of 60 mins. In an embodiment, the time period may vary and may be 45 minutes, or 2 hours depending on the different conditions and if multiple calls are within the geofence location 108 of the FR 104, all calls are displayed on the mapping function. The time period for viewing the calls may be configurable and can be set to any value as per user and/or dispatcher preference and requirement, without deviating from the scope of the invention.

In some embodiments, when a caller calls on a 911 emergency number, the live streaming of data is triggered based on their Automatic Location Identification (ALI) data. The ALI data comprises data related to the caller's location/address, telephone number, and/or some supplementary emergency data. This data is generally stored in an Enhanced 9-1-1 database and can be retrieved in case of emergency calls by the caller's calling service provider. But sometimes the call abruptly hangs up because of one reason or the other. And if the call-taker or dispatcher calls back on the number, then it may become difficult to determine the location of the caller as the outgoing call is not associated with any location or GPS data for live streaming. The present disclosure provides an advantage over known solutions by storing the GPS information associated with the incoming calls in the control server 112*th*. And when the call-taker or dispatcher calls back on the number associated with the incoming call on 911 emergency number or PSAP, it may use the GPS information and location data associated with the previous incoming call to decide the live streaming of data.

In an embodiment, the system 100 may have the ability to adjust the initial playback rate of the call so that it may be played faster in the beginning to catch up with any delay before the call is played by a user, such as the FR 104. For example, if the user is listening to another call before switching to the current call, they can increase the rate of the current call to compensate for the time lag due to attending of the previous call. In a similar way, normal playback rate of the call may also adjustable if needed. This also compensates for the delay between the actual call start and the arrival and correlation of location metadata. In some embodiments, the FR 104 can access all the features of the system 100 described above, by using the computing device 106.

Figure 2:
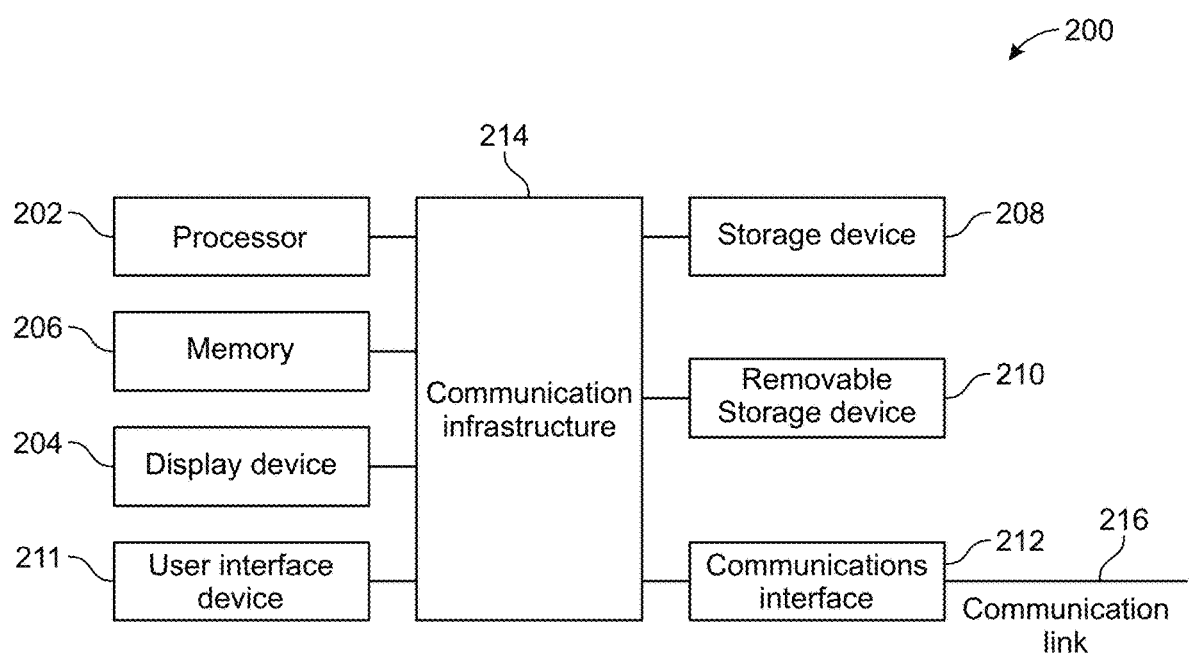
FIG. 2 illustrates a high-level block diagram and process of a computing system for implementing live streaming of emergency dispatch data to the one or more FRs in the field, in accordance with an embodiment of the invention.

FIG. 2 illustrates a high-level block diagram and process of a computing system, such as system 100 or computing device 106, for implementing live streaming emergency dispatch data to one or more FRs in the field, in accordance with an embodiment of the invention. Embodiments of the system may be implemented in different computing environments. The computer system 200 includes one or more processors 202, and can further include an electronic display device 204 (e.g., for displaying graphics, text, and other data), a main memory 206 (e.g., random access memory (RAM)), storage device 208, a removable storage device 210 (e.g., removable storage drive, a removable memory module, a magnetic tape drive, an optical disk drive, a computer readable medium having stored therein computer software and/or data), user interface device 211 (e.g., keyboard, touch screen, keypad, pointing device), and a communication interface 212 (e.g., cellular radio, modem, a network interface (such as an Ethernet card), a communications port, or a PCMCIA slot and card). The communication interface 212 allows software and data to be transferred between the computer system and external devices. The system further includes a communications infrastructure 214 (e.g., a communications bus, cross-over bar, or network) to which the devices/modules are connected as shown.

The processor 202 may be embodied in several different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining and/or multithreading.

In some embodiments, the processor 202 may be configured to provide Internet-of-Things (IoT) related capabilities to the users of the system 100, where the users may be in a vehicle, in a public area, on a highway, or walking and the like. The IoT related capabilities may in turn be used to provide real time updates to the FRs users to take pro-active decision for helping the users. The system 100 may be accessed using the communication interface 212.

In an embodiment, the Information transferred via communications infrastructure 214 may be in the form of signals such as electronic, electromagnetic, optical, or other signals capable of being received by communications interface 212, via a communication link 216 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

In an embodiment, the computer programs (i.e., computer control logic) are stored in main memory and/or secondary memory. The Computer programs may also be received via a communications interface 212. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 3:
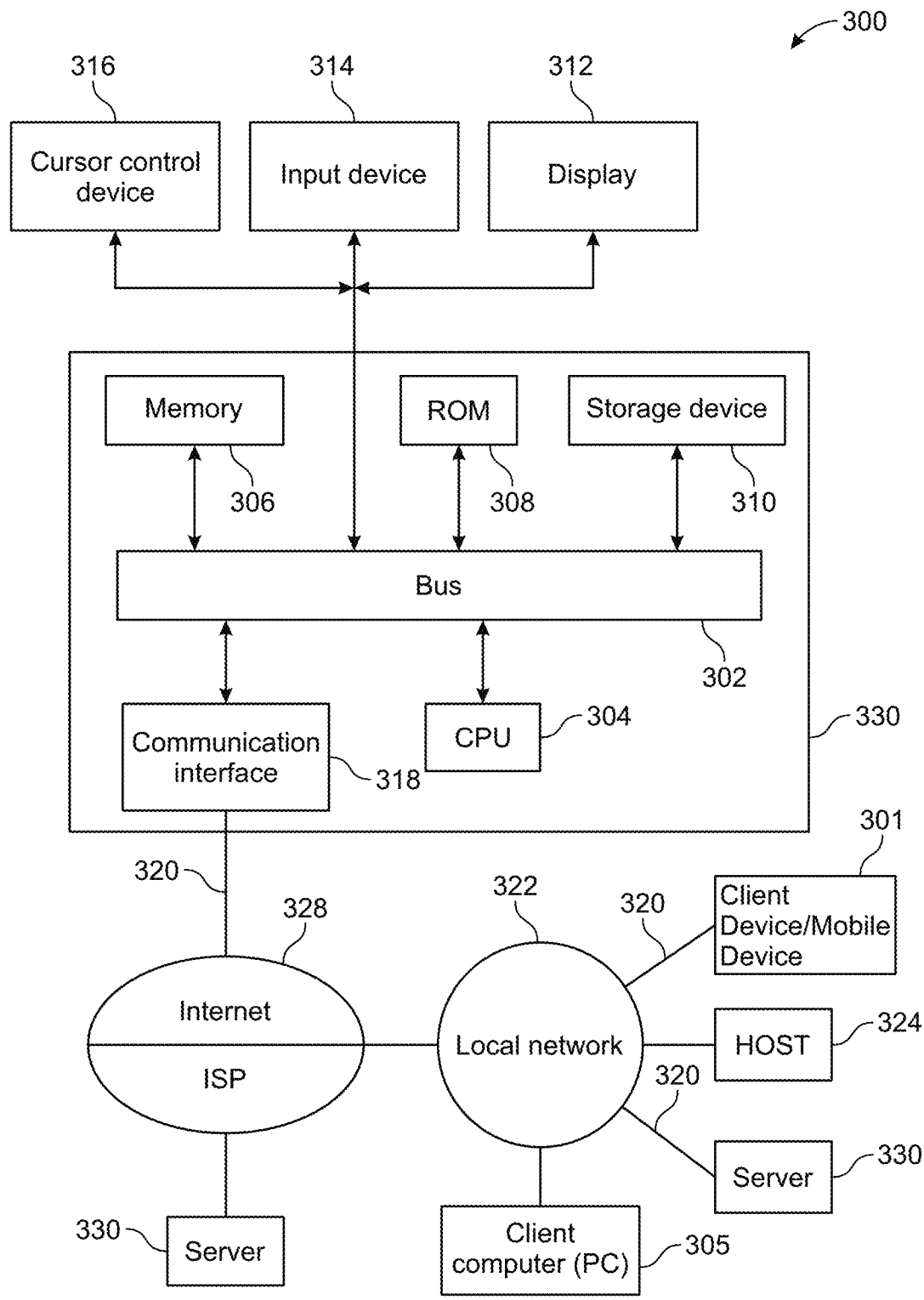
FIG. 3 illustrates a block diagram and process of an exemplary system for live streaming emergency call data to the one or more FRs in the field, in accordance with an embodiment of the invention.

FIG. 3 illustrates a block diagram and process of an exemplary system for live streaming emergency call data to one or more FRs in the field, in accordance with an embodiment of the invention. The system 300 includes one or more client devices 301 such as consumer electronics devices, connected to one or more server computing systems 330. A server 330 includes a bus 302 or other communication mechanism for communicating information, and a processor (CPU) 304 coupled with the bus 302 for processing information. The server 330 also includes a main memory 306, such as a random access memory (RAM) or other dynamic storage device, coupled to the bus 302 for storing information and instructions to be executed by the processor 304. The main memory 306 also may be used for storing temporary variables or other intermediate information during execution or instructions to be executed by the processor 304. The server computer system 330 further includes a read only memory (ROM) 308 or other static storage device coupled to the bus 302 for storing static information and instructions for the processor 304. A storage device 310, such as a solid state drive, magnetic disk or optical disk, is provided and coupled to the bus 302 for storing information and instructions. The bus 302 may contain, for example, sixty-four address lines for addressing video memory or main memory 306. The bus 302 can also include, for example, a 32-bit or 64-bit data bus for transferring data between and among the components, such as the CPU 304, the main memory 306, video memory and the storage 310. Alternatively, multiplex data/address lines may be used instead of separate data and address lines.

The server 330 may be coupled via the bus 302 to a display 312 for displaying information to a computer user. An input device 314, including alphanumeric and other keys, is coupled to the bus 302 for communicating information and command selections to the processor 304. Another type of user input device comprises cursor control 316, such as a mouse, a trackball, or cursor direction keys for communicating direction information and command selections to the processor 304 and for controlling cursor movement on the display 312.

According to one embodiment, the functions are performed by the processor 304 executing one or more sequences of one or more instructions contained in the main memory 306. Such instructions may be read into the main memory 306 from another computer-readable medium, such as the storage device 310. Execution of the sequences of instructions contained in the main memory 306 causes the processor 304 to perform the process steps described herein. One or more processors in a multi-processing arrangement may also be employed to execute the sequences of instructions contained in the main memory 306. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. The computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 304 for execution. Such a medium may take many forms, including but not limited to, non-volatile media, volatile media, and transmission media. Non-volatile media includes, for example, optical or magnetic disks, such as the storage device 310. Volatile media includes dynamic memory, such as the main memory 306. Transmission media includes coaxial cables, copper wire and fiber optics, including the wires that comprise the bus 302. Transmission media can also take the form of acoustic or light waves, such as those generated during radio wave and infrared data communications.

In various embodiments, common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

In some embodiments, various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the server 330 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received from the main memory 306 may optionally be stored on the storage device 310 either before or after execution by the processor 304.

In some embodiments, the server 330 (which may be equivalent to the control server 112 discussed in conjunction with FIG. 1) also includes a communication interface 318 coupled to the bus 302. The communication interface 318 provides a two-way data communication coupling to a network link 320 that is connected to the worldwide packet data communication network now commonly referred to as the Internet 328. The Internet 328 uses electrical, electromagnetic or optical signals that carry digital data streams. The signals through the various networks and the signals on the network link 320 and through the communication interface 318, which carry the digital data to and from the server 330, are exemplary forms or carrier waves transporting the information.

In another embodiment of the server 330, interface 318 is connected to a network 322 via a communication link 320. For example, the communication interface 318 may be an integrated services digital network (ISDN) card or a modem to provide a data communication connection to a corresponding type of telephone line, which can comprise part of the network link 320. As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information.

The network link 320 typically provides data communication through one or more networks to other data devices. For example, the network link 320 may provide a connection through the local network 322 to a host computer 324 or to data equipment operated by an Internet Service Provider (ISP). The ISP in turn provides data communication services through the Internet 328. The local network 322 and the Internet 628 both use electrical, electromagnetic or optical signals that carry digital data streams. An optional virtual private network (VPN) extends a private network across a public network, enabling a user to send and receive data across shared or public networks. The signals through the various networks and the signals on the network link 320 and through the communication interface 318, which carry the digital data to and from the server 330, are exemplary forms or carrier waves transporting the information.

In various embodiments, the server 330 can send/receive messages and data, including e-mail, program code, through the network, the network link 320 and the communication interface 318. Further, the communication interface 318 can comprise a USB/Tuner and the network link 320 may be an antenna or cable for connecting the server 330 to a cable provider, satellite provider or other terrestrial transmission system for receiving messages, data and program code from another source.

The example versions of the embodiments described herein may be implemented as logical operations in a distributed processing system such as the system 300 including the servers 330. The logical operations of the embodiments may be implemented as a sequence of steps executing in the server 330, and as interconnected machine modules within the system 300. The implementation is a matter of choice and can depend on performance of the system 300 implementing the embodiments. As such, the logical operations constituting said example versions of the embodiments are referred to for e.g., as operations, steps or modules.

Similar to a server 330 described above, a client device 301 can include a processor, memory, storage device, display, input device and communication interface (e.g., e-mail interface) for connecting the client device to the Internet 328, the ISP, or LAN 322, for communication with the servers 330.

The system 300 may further include computers (e.g., personal computers, computing nodes) 305 operating in the same manner as client devices 301, where a user can utilize one or more computers 305 to manage data in the server 330.

Figure 4:
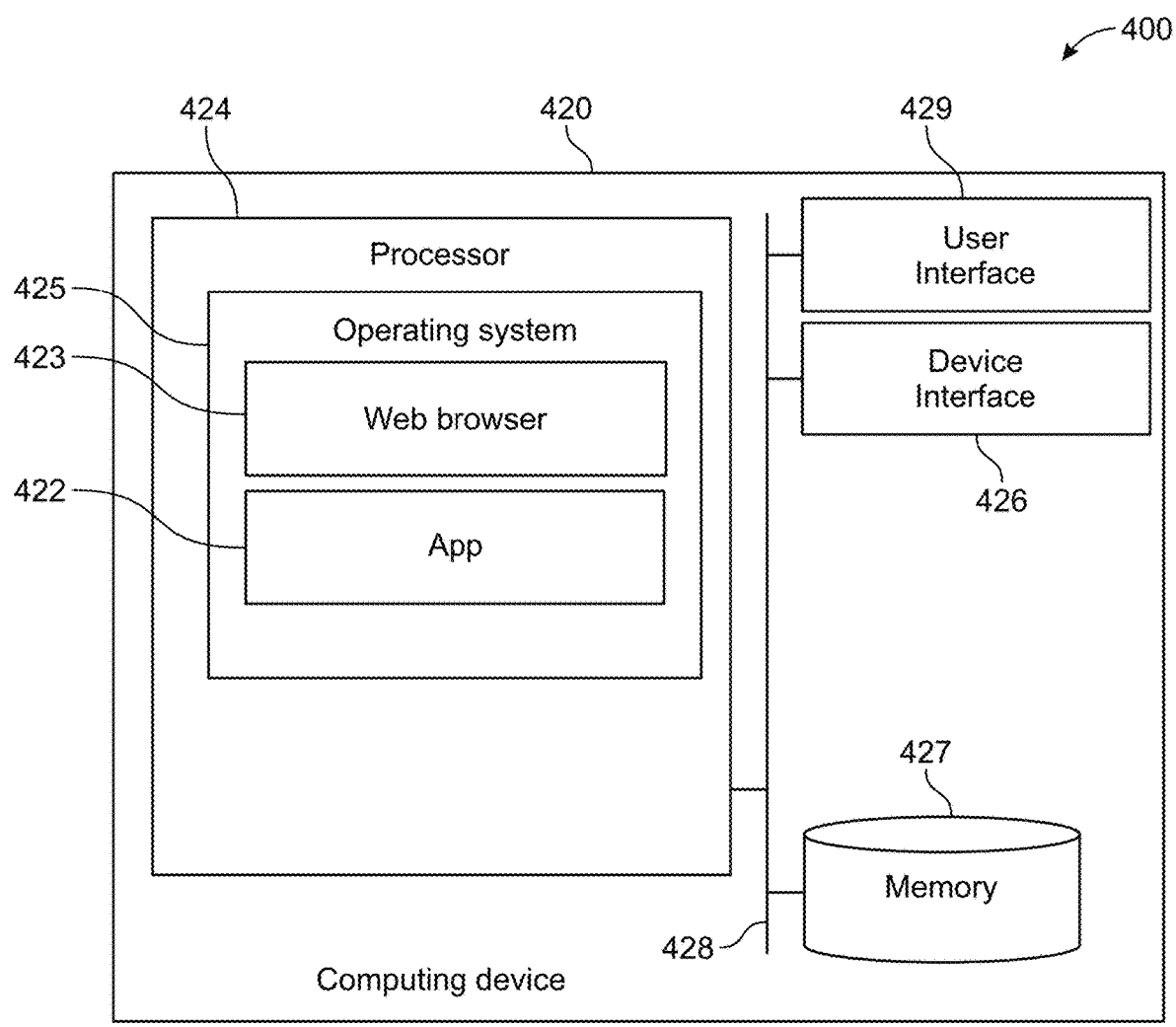
FIG. 4 illustrates an example top-level functional block diagram of a computing device embodiment for implementing the live streaming of emergency call data to the one or more FRs in the field, in accordance with an embodiment of the invention.

FIG. 4 illustrates an example top-level functional block diagram 400 of a computing device 420 embodiment for live streaming emergency call data to one or more FRs in the field, in accordance with an embodiment of the invention. The computing device 420 may be equivalent to the computing device 106 or the capture device 114 discussed in conjunction with FIG. 1. The computing device 420 comprises a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen.

Optionally, the addressable memory may include any type of computer-readable media that can store data accessible by the computing device 420, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet.

These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above.

In an embodiment, the application 422 may have a plurality of features for better FR experience. The application 422 may provide for allowing the FR, such as FR 104 to rewind and re-listen to the received live-streamed emergency call for better understanding when call the quality of the received emergency call is poor.

In another embodiment, the application 422 may also provide for allowing FRs to listen to an emergency call in parallel with call-takers at the PSAP 110, thereby reducing the chances of misunderstanding what a caller is saying. The application 422 may have a plurality of features such as the application 422 may provide customizable shortcuts such as play/pause, mute/unmute, forward/rewind, increase/decrease monitoring radius, dismiss or bypass a call, that are customized by the FR 104. In one embodiment, the FR 104 may have the option of listening to the call, muting the call, or closing the call by using the application 422 on their computing device 106.

Figure 5A:
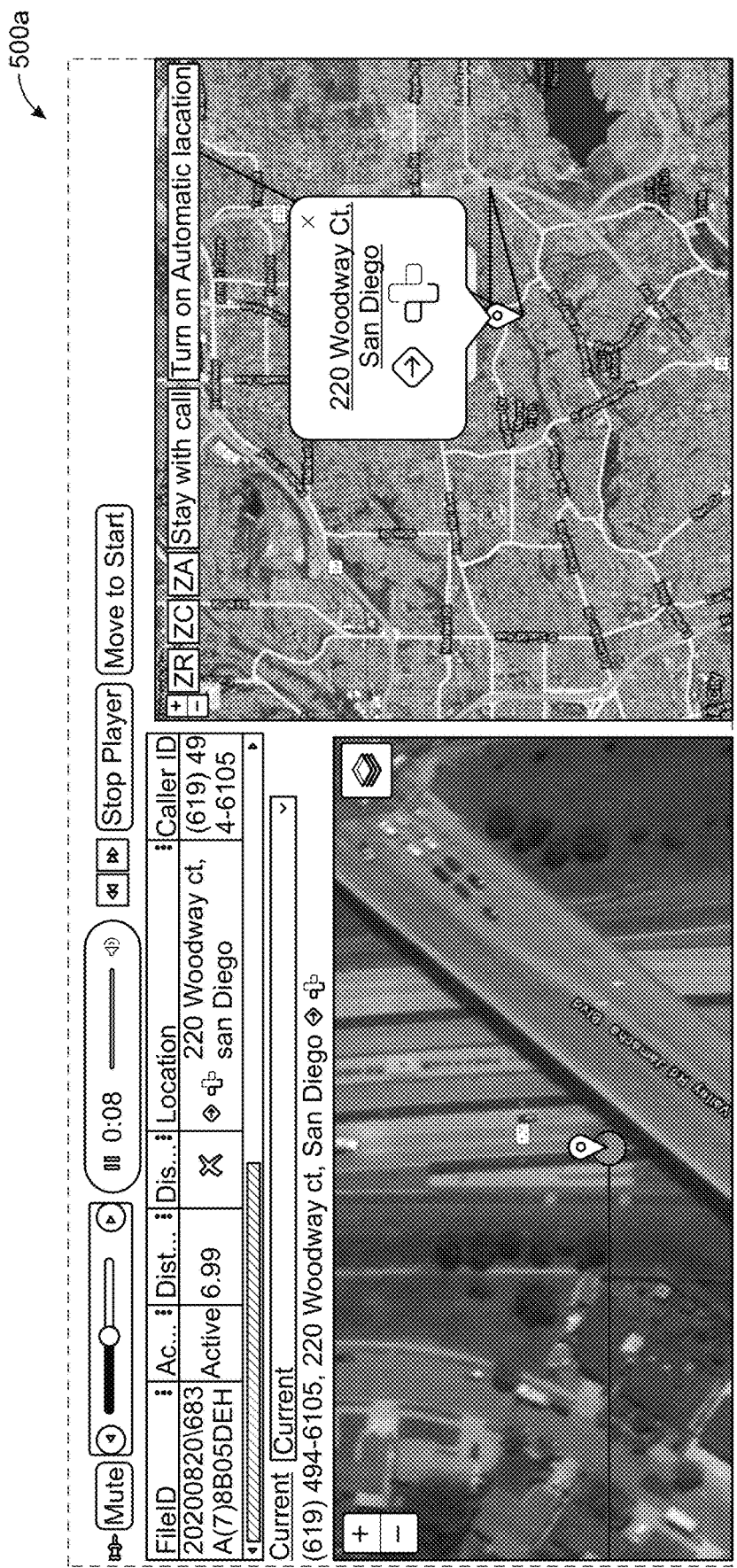
FIGS. 5A-5J illustrates the plurality of graphical user interfaces (GUIs) of the application associated with the computing device of the one or more FRs in the field, in accordance with an embodiment of the invention.

FIGS. 5A-5J illustrates the plurality of graphical user interfaces (GUIs) of the application associated with the computing system for live streaming emergency call data to first responders in the field, in accordance with an embodiment of the invention. The plurality of GUIs may be like the user interface 429 discussed in conjunction with FIG. 4 and may be accessed by the one or more FRs in the field, using their computing device 106. As shown in FIG. 5A, in the exemplary user interface 500*a*, the FR 104 may be able to see the location of the 911 call on user interface 429 of computing device 420 in relationship to the FR's 104 current position on a map. For example, when the caller is moving, the application 422 may also display location history and the current location of the caller on the computing device 106 (like computing device 420). The application may also display the map or route followed by the caller relative to the location of FR vehicle 102 having the computing device 106. This may enable the one or more FRs to view the information of the route followed by the caller and take an appropriate route to reach them at the earliest in some exemplary situations, like when the caller itself is not stationary. For example, if a caller has experienced a vehicle failure and needs assistance in stopping the vehicle, the FR 104 who is within the geofenced location 108 associated with the call, can view how the caller is moving, and choose an appropriate route to reach them.

Figure 5B:
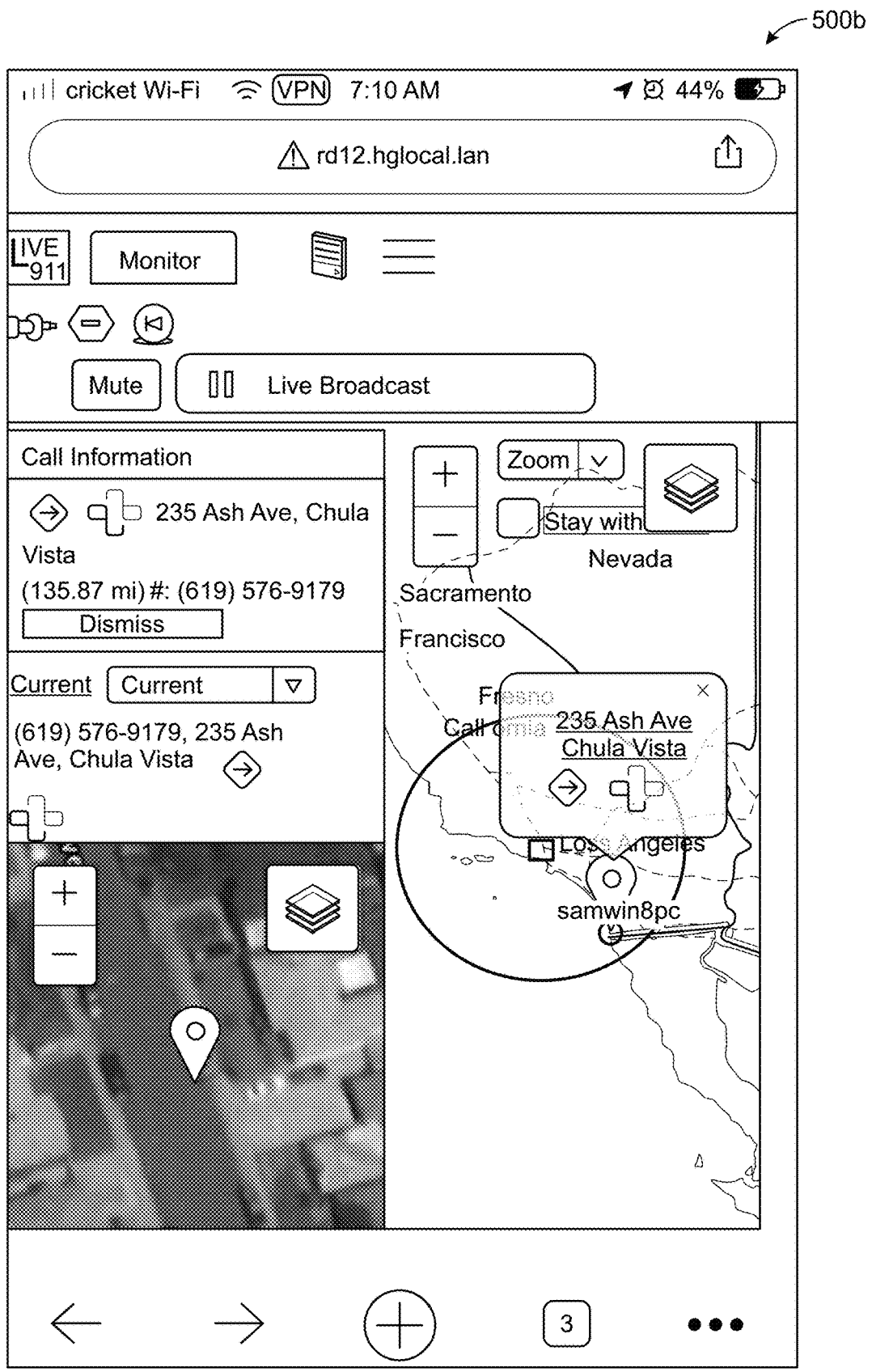

In another embodiment, the application 422 may have the GUI 500*b* as shown in FIG. 5B. The GUI 500*b* shows that the application 422 is responsive and adjustable by design, according to the type of computing device of the FR 104. The GUI 500*b* may change based on the type of device being used as the computing device 420. For example, a notification alert on mobile is different than a notification alert on a laptop. Thus, the present invention provides an advantage over known solutions by providing an adjustable GUI to the FR 104 based on different types of computing devices.

In an embodiment, the application 422 may be installed as a Native client application according to the type of computing device 106 of the FR 104, The native client application 422 may be a wrapper to a browser-based application. It can be configured to launch on the favorite browser of the user, such as the FR 104.

Figure 5C:
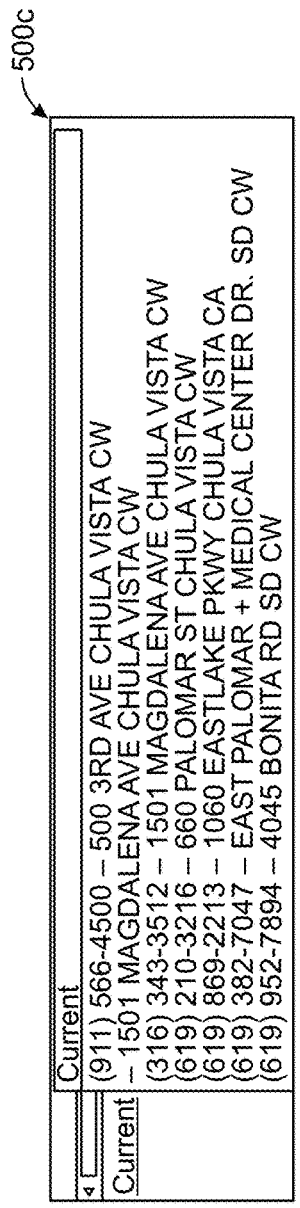

FIG. 5C shows an exemplary GUI 500*c* in which the application 422 may be configured to display a list of all calls received during a preconfigured time period, such as during the past one hour (a period that is configurable). The data of all calls is maintained and displayed in the form of a dropdown list. The application 422 may be configured to display on the GUI 500*d*, callerID data, location data, and links to display emergency response data, such as Rapid-SOS® data associated with the caller, when the FR 104 selects any call from the dropdown list. In some embodiments, the dropdown list can be used by the FR 104 for callback purposes if the caller abruptly hangs the call.

Figure 5D:
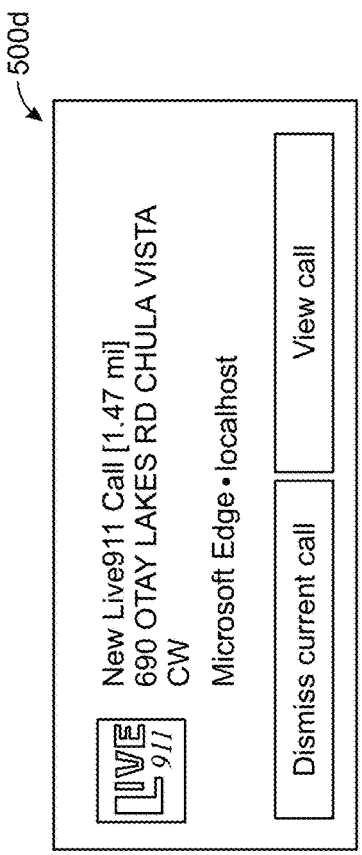

FIG. 5D shows an exemplary GUI 500*d*, displaying a plurality of notifications that may be added to allow for background operation of the application 422 on the computing device 106 of the FR 104. This may allow the FR 104 to keep carrying on with other tasks or accessing other applications on their computing device 106, while the application 422 runs in the background. Whenever any live emergency call and its associated data is received, a notification is shown to the FR 104, who may choose to accept or dismiss the call. Thus, the application 422 will still provide alerts to the FR 104, even though it is not actively opened on their computing device 106. The provision of the plurality of notifications is adaptable as the instances of the application 422 grow onto different platforms. For example, the types of notifications may be adaptable based on the platform or the type and capabilities of the computing device 106. The types of notifications may include such as push notifications, emails, SMS, in-app messages, and the like, provided to users on various devices including but not limited to desktops, phones, tablets, and the like. Thus, the system 100 and the application 422 to provide live streaming of emergency data to the one or more FRs 104 as disclosed herein, and supported by the GUI 500*d* may provide a better, more responsive, easily accessible, more friendly interface to the one or more FRs 104, as compared to other known solutions in the art, which specifically lack such responsiveness and ease of access.

Figure 5E:
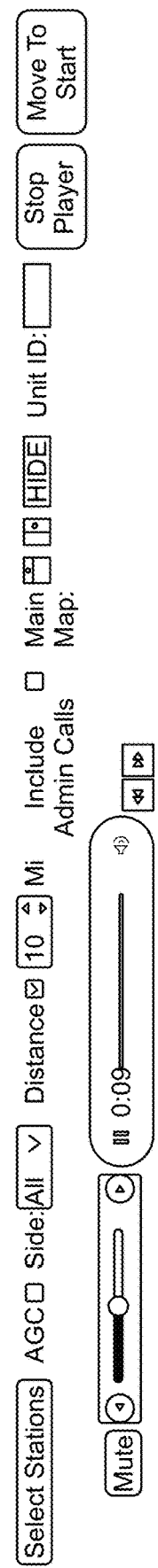

In another embodiment, FIG. 5E illustrates an exemplary GUI 500*e* of, the application 422 that may help boost the sound levels of audio associated with incoming emergency calls. The GUI 500*d* can be helpful when there is too much ambient noise in an environment where the FR 104 is attending the call. By boosting the audio level of the call, the FR 104 may be able to listen in to the caller more clearly and understand their state in a better and clear manner to take the next action.

Figure 5F:
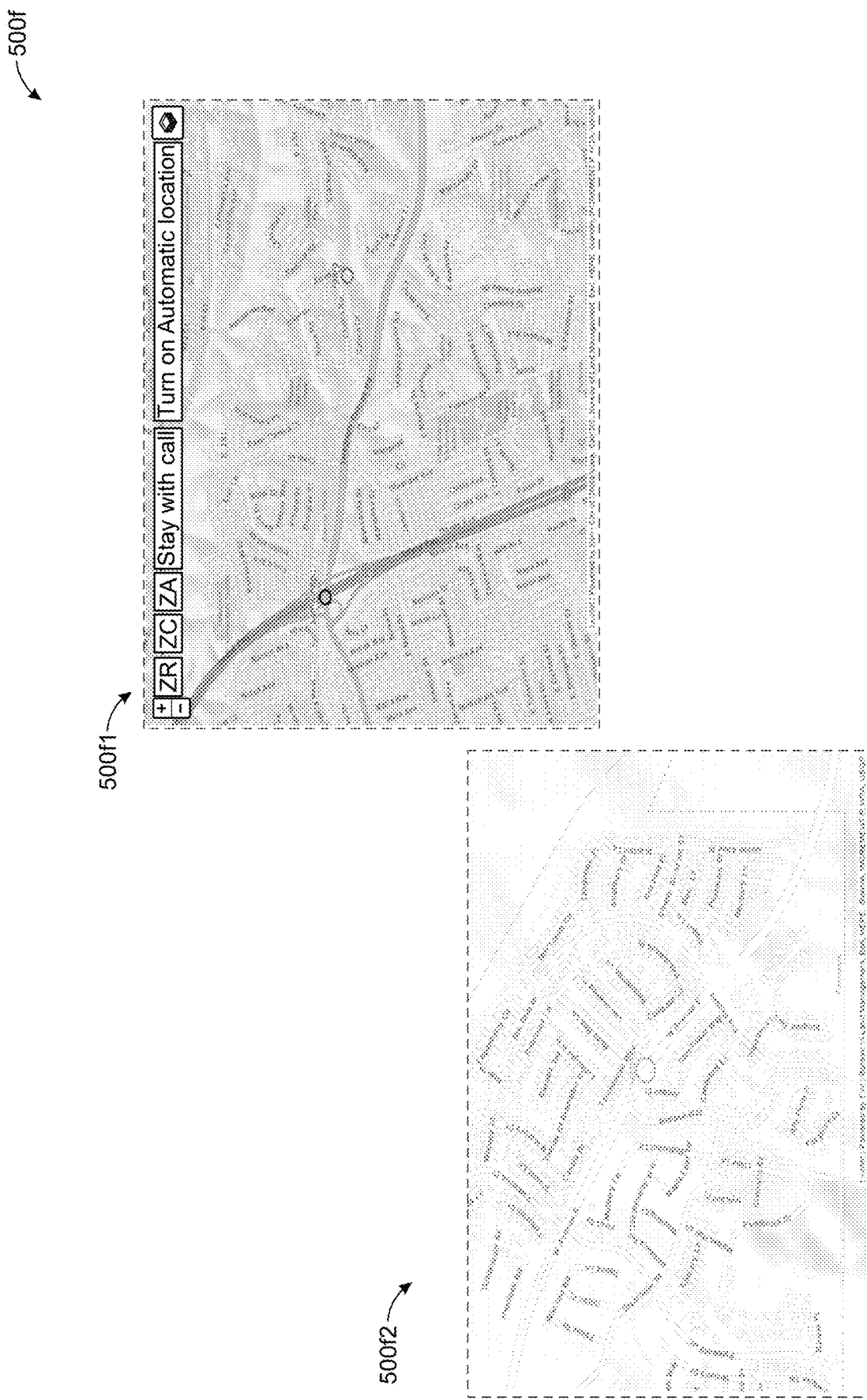

In another embodiment, FIG. 5F illustrates an exemplary GUI 500*f* that is configured to display location-related data and location metadata for incoming emergency calls. As illustrated in the GUI 500*f*, a map display may include a main map 500*f*1 and a secondary map 500*f*2. The main map 500*f*1 may display the locations of other users who are logged into the application and continuously refresh their locations to ensure that the latest locations of the various users may be seen on the map. The main map 500*f*1 may be configured to display the location of the FR 104 who is listening to the call by showing the unit ID of the FR 104. In some embodiments, the FR 104 who is listening to the call is shown by a different color on the main map 500*f*1.

Figure 5G:
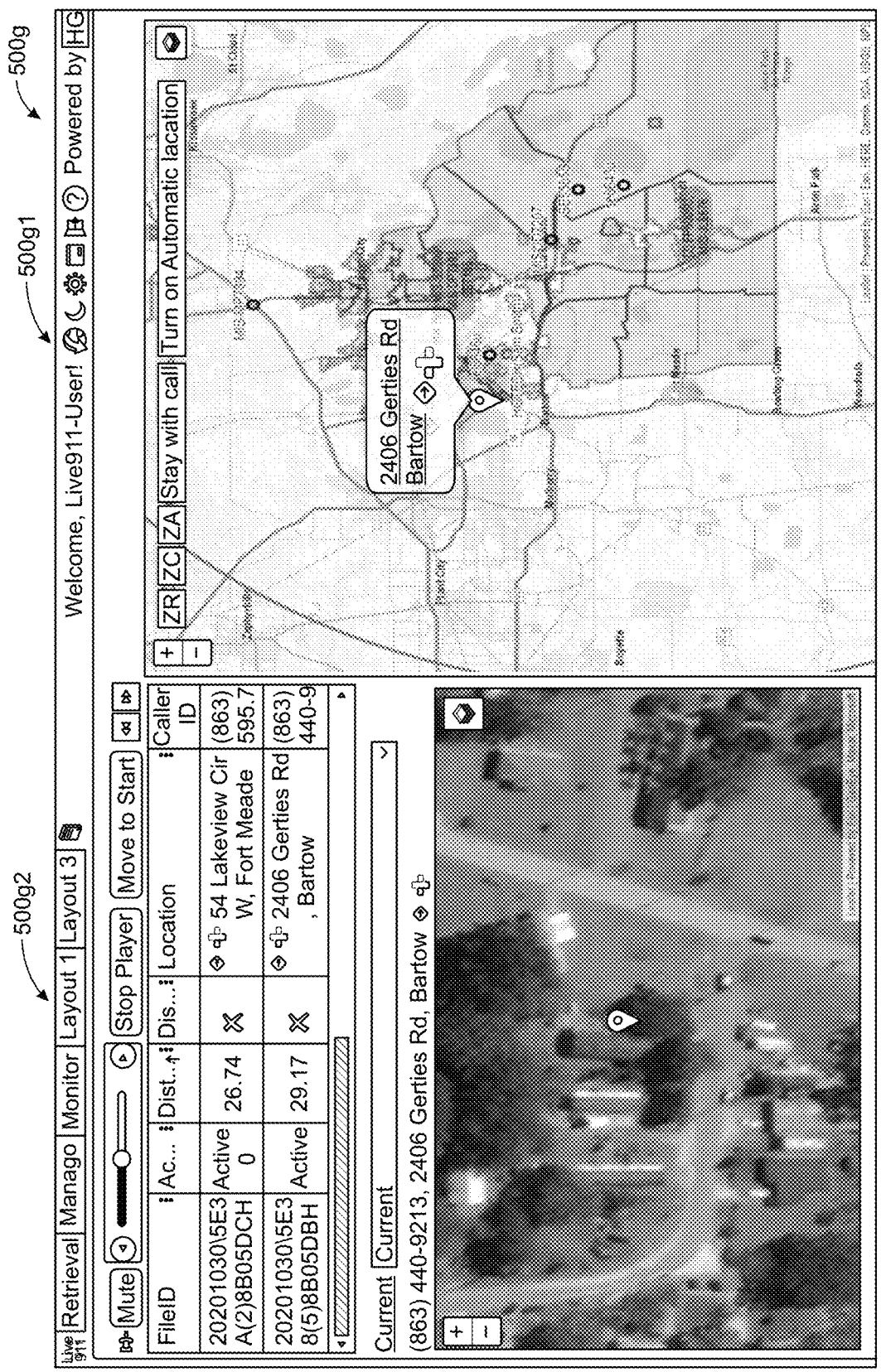
Figure 5H:
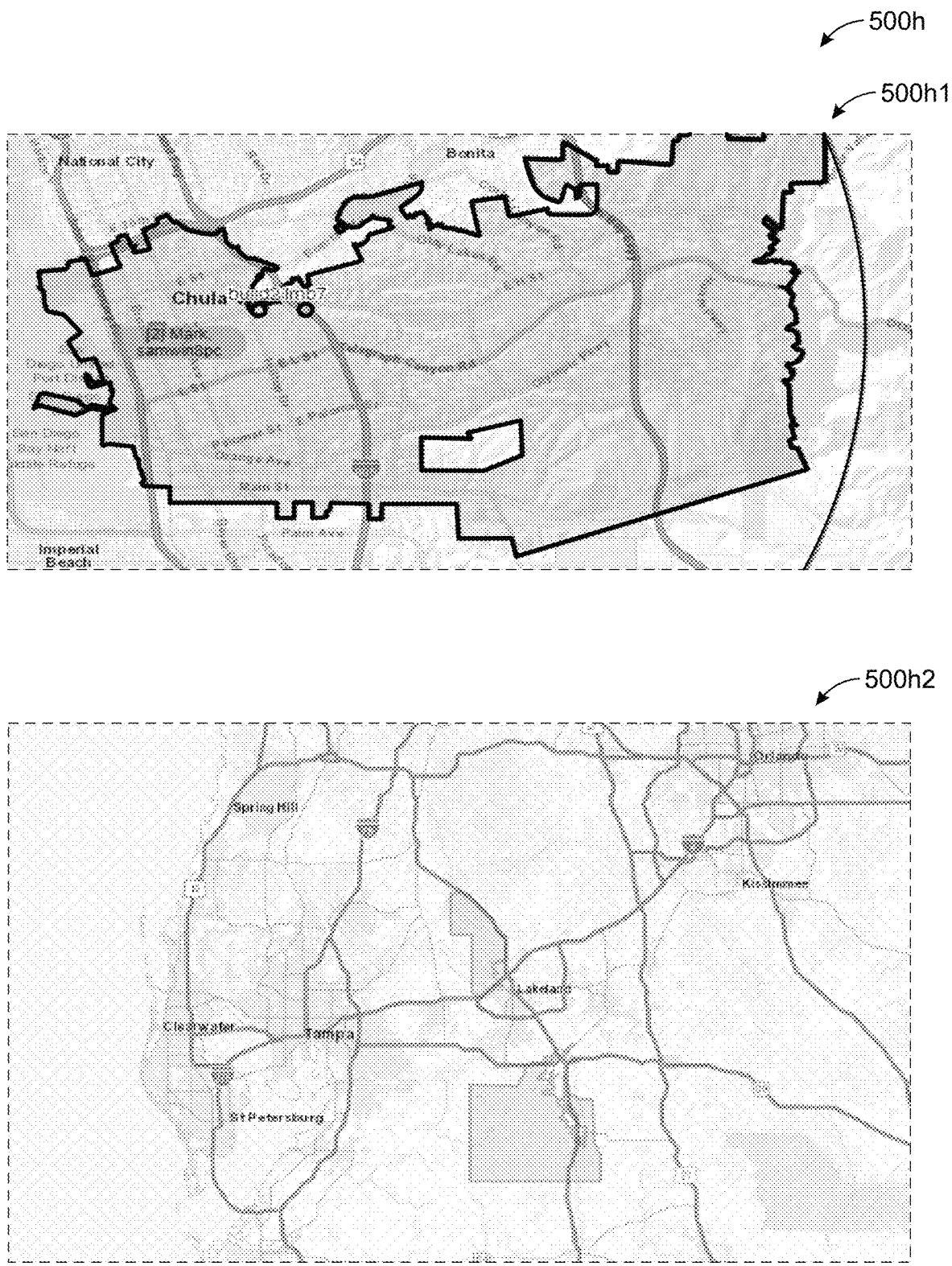

In another embodiment, FIG. 5G illustrates an exemplary GUI 500*g* showing two maps, a main map 500*g*1 and a secondary map 500*g*2. The main map 500*g*1 may display all on-going calls while the secondary map 500*g*2 may display the location of the current call or any call from history. The main map 500*g*1 can be moved to the top or right of the page and can also be hidden if needed. In an embodiment, the secondary map 500g2 is used to display the zoomed-in location of the current call or any selected call from history. In an embodiment, the secondary map 500g2 may provide the route followed and more details associated with the caller. The secondary map 500g2 may be on the left side. This map 500g2 may provide more details about the location of the caller. The secondary map 500g2 may also point to a custom map URL that may be provided to display additional information like house numbers, better images, etc. In an embodiment, the application 422 also has the option to hide the main map 500g1 and only see the secondary map 500g2. In an embodiment, the FR 104 may also add custom overlays on the map to display additional information which is entirely customizable by the FR 104. In another embodiment, FIG. 5H illustrates an exemplary GUI 500h to enable the setting of a geofence location. As shown in FIG. 5H, the geofence can be specified for the entire application 422, and thus for the FR 104, by utilizing polygons covering the area from where the FR 104 desires to receive the calls. In an embodiment, the FRs may also specify a geofence for their own area of coverage thereby limiting calls only to the area they are interested in. For example, GUI 500h1 shows setting up of a polygon as the geofence or geofence location 108 for the entire application 422. GUI 500h2 shows setting up of another polygon as the geofence or the geofence location 108 by the FR 104 based on defining their own area of coverage, thereby limiting calls only to the area they are interested in.

Additionally, the FRs may have the ability to customize color and opacity of geofence to make it easier to visualize calls inside/outside of the geofence. In various embodiments, calls markers are colored differently based on whether they are in or out of the geofence. In an embodiment, when geofencing is enabled, the FR 104 can choose to either hide calls outside their specified geofence location 108 or merely show them or stream them automatically. Additional enhancements include establishing "or" logic that will allow a call outside the geofence but within a distance threshold, so that even though the caller is outside of the geofence location 108 area, but is still within the threshold distance from the geofence location 108, and so the emergency call is streamed to the FR 104 who has configured their UI, such as GUI 500h2, for receiving those calls. For example, the emergency call within a certain distance of a school (for example 0.5 miles) will be pushed to FR within a configurable distance (for example 4 miles) from the school. The pushed calls will be streamed regardless of any filtering configured in the UI by the corresponding FR.

Figure 5I:
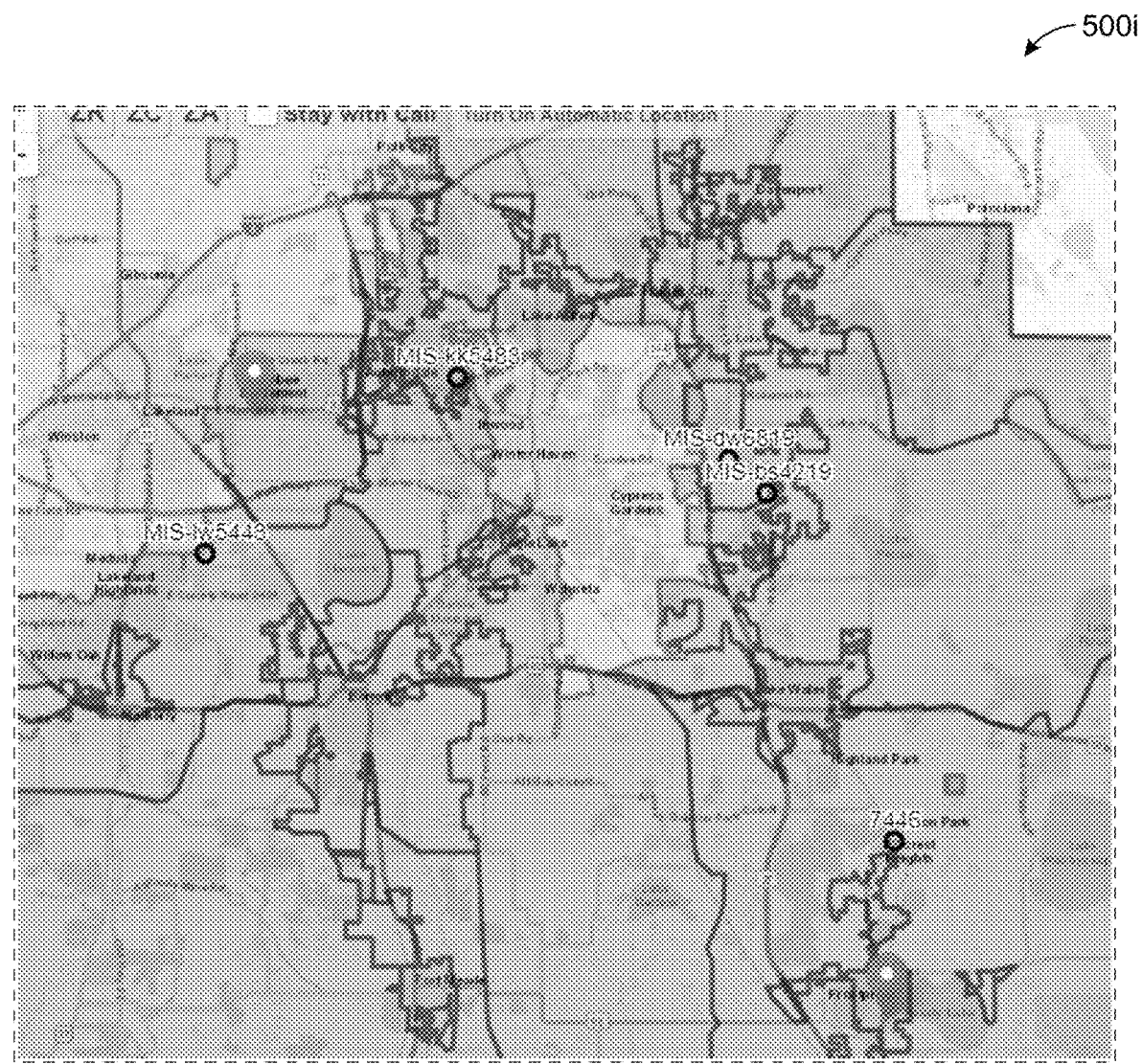

In another embodiment, FIG. 5I illustrates an exemplary GUI 500i in which locations of all active users of the application 422 are displayed. The GUI 500i may be configured to display and continuously refresh the locations of other users who are logged into the application.

Figure 5J:
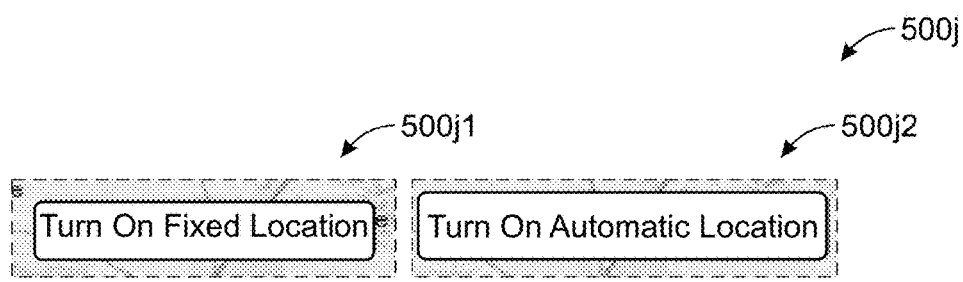

In another embodiment, FIG. 5J illustrates an exemplary GUI 500J which provides two options to a user, a first option 500j1 to turn on a fixed location, and a second option 500j2 to turn on automatic location. In an embodiment, the FR 104 may have the option to set the user's location to a fixed location on the map. This may be helpful if there is an issue in determining the exact location of the FR by all other available means. One can revert to an automatic location once GPS location determination is working again properly.

Figure 6:
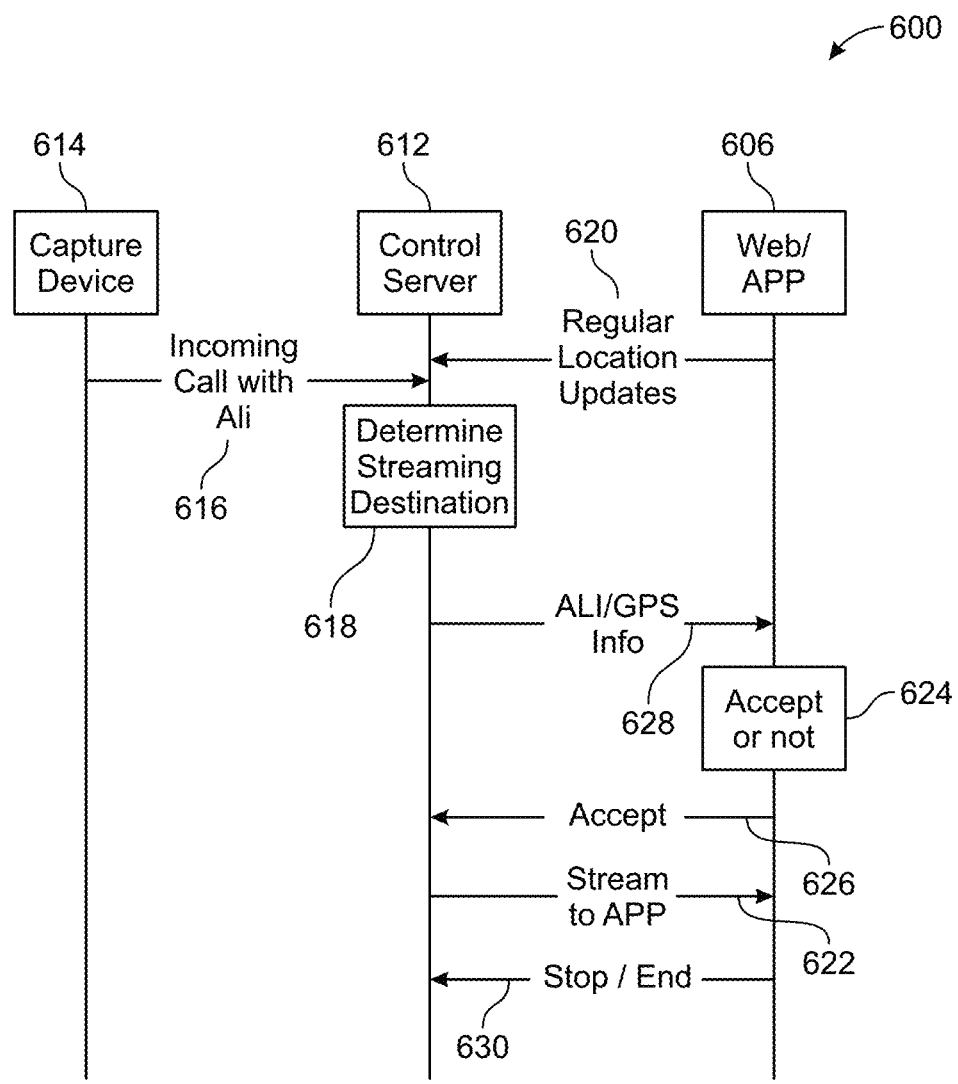
FIG. 6 illustrates a block diagram of a process for live streaming emergency call data to the one or more FRs in the field, in accordance with an embodiment of the invention.

In an embodiment, the user can set a unit ID in the application 422 which allows other users to know who is listening to the calls and where they are located on the map. The Unit Id helps in the identification of the FRs who listening to a call and are available for dispatch. FIG. 6 illustrates a block diagram of a process 600 for live streaming emergency call data to one or more FRs in the field, in accordance with an embodiment of the invention. The system 100 provides for collecting metadata from various sources while monitoring 911 calls for correlation and filtering of location metadata and other emergency response data, such as RapidSOS® data. In turn, raw audio streams and other data may be relayed to FRs nearest the call in real-time. In an embodiment, the user, the caller, or the calling party may be used interchangeably to mean the same, without deviating from the scope of the invention.

In one embodiment, a capture device 614 (equivalent to capture device 114), such as a computing device at a call center of the PSAP, captures audio data and location metadata associated with an incoming call. The location metadata may include the ALI data for the incoming emergency call. The location metadata may further be refined by querying third party databases like RapidSOS® and ArcGIS®, and include additional information like street address. The capture device forwards the captured data to a control server 612 (equivalent to control server 112). The control server 612 is also configured to receive regular location updates 620 from a web app 606 (equivalent to application 422), which may be running on the computing device 106 of one or more FRs 104 in the field. These regular location updates may include data about geofenced location 108 of the one or more computing devices 106 of one or more FRs 104 in the field.

The control server 612 of the capture device 614 may be configured to correlate the refined location metadata of the incoming emergency call with the geofenced location 108 and at 618, determine a streaming destination. The streaming destination may be the location associated with the one or more computing devices/web app 606 of the one or more FRs 104, which are within the geofenced location 108.

Thus, after the correlation, the control server 612 of the capture device 614 may be configured to transmit a first signal 622 to the one or more computing devices/web app 606, in the form of a stream of data comprising a portion of captured audio and corresponding refined location metadata, such as ALI or GPS data, of the incoming emergency call.

At 624, after receiving the first signal, the one or more computing devices/web app 606, may be configured to choose one to accept or not accept the first signal 622. If the one or more computing devices/web app 606 accepts the first signal 622, it sends an accept signal 626 to the control server 612 of the capture device 614. The control server 612 of the capture device 614 in turn, transmits a second signal 628 to the one or more computing devices/web app 606, which comprises a plurality of data related to the incoming emergency call. In some embodiments, the data related to the incoming emergency call (also referred to as the emergency call metadata) may be first screened, such as by the capture device 614 or the one or more computing devices/web app 606, to filter the emergency call metadata to select only emergency calls of interest or relevance to the one or more computing devices. Web app 606 of one or more FRs 104. This data may include, for example, emergency response data derived from RapidSOS® data, ALI data, and GPS data related to the captured audio and corresponding location metadata. After this, at 630, the process may end with the one or more computing devices/web app 606 taking appropriate action based on the received data.

In some embodiments, the geofence, such as geofence 108 around the FR's 104 current location is configurable by the control server 612 by a certain distance from the location of the FR 104 or the one or more computing devices/web app 606. In one embodiment, the distance is a radial distance from the location of the FR 104. Other geofence 108 configurations are possible and contemplated, such as a rectangular-shaped geofence, a square-shaped geofence, and the like. The location information of the FR 104 is periodically transmitted to the control server 612 via signal 620, so long as the FR 104 stays logged into the application 606 on the computing device 106.

In one embodiment, the capture device 614 may determine both the calling (and the called) party associated with each incoming call to the PSAP 110. The calling and the called party may be determined through a Session Initiation Protocol (SIP). The SIP may be a signaling protocol used for initiating, maintaining, modifying, and terminating the real-time sessions that may involve video, voice, messaging, and other communications applications between two or more endpoints on, for instance, Internet Protocol (IP) networks. The capture device 614 may further determine the call circuit or "trunk" utilizing the SIP. In one embodiment, the capture device 614 may determine the caller GPS location utilizing Automatic Location Identification (ALI) data and RapidSOS® data. In one embodiment, ALI may be an enhanced electronic location system that automatically relays a caller's address when they call into the PSAP 110, whether they call from a mobile device or a landline.

In an embodiment, the RapidSOS® data may be configured in the control server 612, a third-party application, or on the user interface of the computing device 106. In another embodiment, RapidSOS® may link data from the calling party to the PSAP 110 and the FR 104. The RapidSOS® feature may provide more precise and accurate GPS coordinates of the calling party and display the same in the user interface of the computing device 106. The RapidSOS® may provide live updates when the caller is moving, and the call is in progress. In an embodiment, if RapidSOS® integration is enabled, the metadata available for any given call from RapidSOS® and is displayed to the user on demand. The RapidSOS® data may also contain medical data as well. The medical data may be used while in an emergency to know the medical history of the user.

The capture device 614 may transmit the signal 616 of the ALI data to the control server 612. The control server 612 may then determine 618 where the ALI data is to be transmitted. More specifically, the control server 612 may determine which FR (or FRs) within a geofenced area is to receive the real-time ALI data, where the geofenced area is determined by the control server 612. Furthermore, the control server 612 may determine the caller street address utilizing the ALI. The control server 612 may determine more precise street address by means of additional queries to an ArcGIS-like geocoding service In one embodiment, when the 911 call arrives at the PSAP 110, the capture device 6114 captures the audio as well as location metadata associated with the call. The control server 612 correlates the incoming call information with the geofenced locations of all FRs, such as geofence 108 associated with the FR 104. The control server 612 may then transmit the first signal 622 of the captured audio to the FR's 104 application on the computing device 106 so that the FR 104 may hear the call as it occurs in real-time. If the FR 104 accepts the incoming streaming data, an accept signal 626 may be sent from the computing device 106 to the control server 112. After that, the second signal 628 may include the ALI data and the GPS data of the emergency location and the first signal 622 of the captured audio data may be transmitted to the FR 104 based on the FR 104 determining whether or not to accept 624 the incoming streaming data.

In one embodiment, the GPS data of the second signal 628 sent by the control server 112 may be sent to a mapping function of the application associated with the computing device 106. In one embodiment, the application provides for filtering out non-emergency calls to reduce distractions to FRs. More specifically, the application may filter calls based on a "Called Number", a "Calling Number", and a "Trunk" obtained by the control server 112. To allow direct 911 calls, the application may verify that the Trunk is designated as a "911" trunk and that the Called Number is a 911 service.

In some embodiments, to allow for dropped 911 calls with a callback, the application 606 may store the Calling Number of 911 calls and the application may then allow calls to that Called Number. Such rules prevent ordinary or "Administrative" calls from being offered to the FRs6

If the FR 104 no longer needs to receive streaming data from the control server 612, the FR 104 may transmit the signal 630 from the computing device or application 606 to the control server 612 to end the process.

Figure 7:
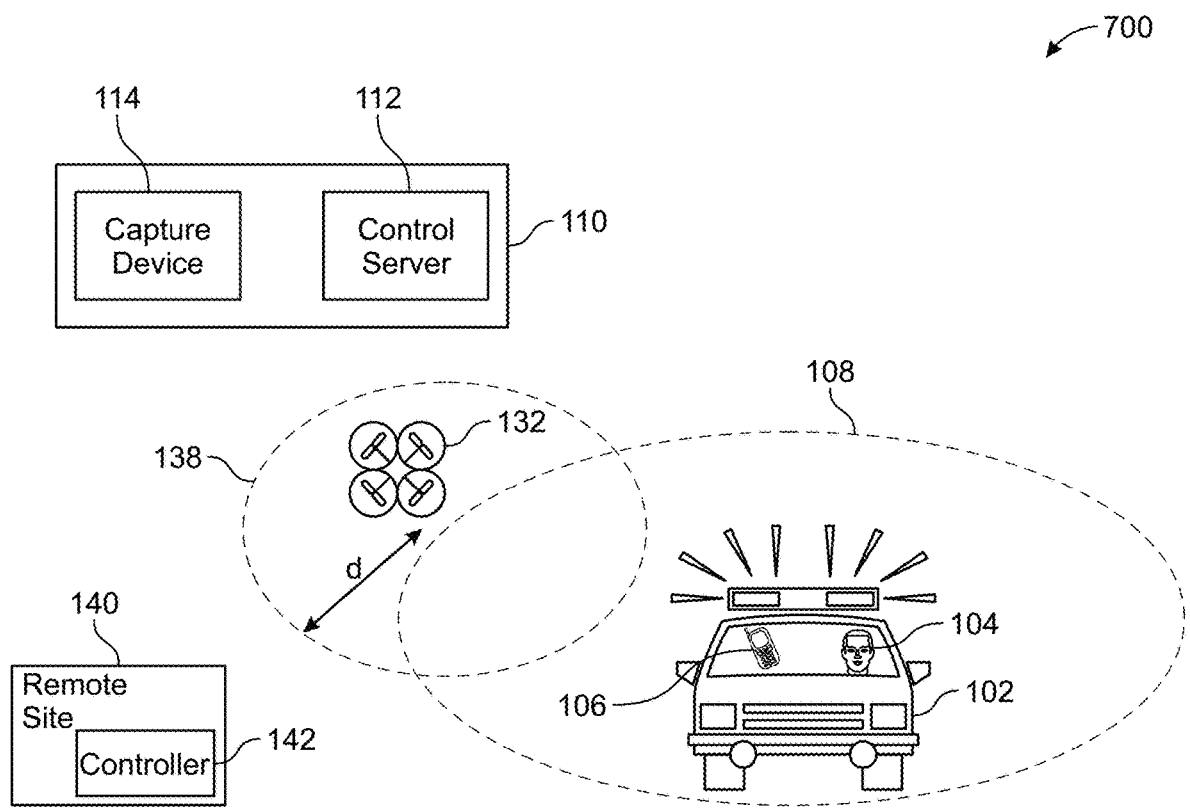
FIG. 7 illustrates a schematic of an alternative system for live streaming emergency call data to the one or more FRs in the field, in accordance with an embodiment of the invention.

FIG. 7 illustrates a schematic of an alternative system for live streaming emergency call data to first responders in the field, in accordance with an embodiment of the invention. The features of system 100 are retained throughout, with the system 700 further including a drone 132 associated with a geofence 138 of FIG. 1. More specifically, a Drone as First Responder (DFR) program may provide for setting the geofencing range. In one embodiment, the drone 132 may be associated with a remote site 140. The remote site 140 may have a controller 142 that may set the geofence 138. The geofence 138 size set by the controller 142 is to be the maximum distance that the drone 132 may travel. For example, the drone 132 may travel a maximum distance "d". In one embodiment, the maximum distance is three nautical miles. In another embodiment, the maximum distance is greater than three miles. In yet another embodiment, the maximum distance is less than three miles. That distance "d" and the location of the remote site 140 may be determined by the capture device 114 based on a signal transmitted by the controller 142. Meanwhile, the FRs 104 are periodically transmitting the FR's location data to the control server 112. The control server 112 may then determine which FRs are within the geofence range 138 set by the drone's 132 maximum travel distance "d". The control server may then proceed to transmitting signal 122 of the captured emergency call audio to the FR's application on the computing device 106 so that the FR, such as FR 104 may hear the call as it occurs in real-time.

In an embodiment, the system 700 may launch the drone 132 to a specific location for a specific call. This feature may reduce the time spent in manually specifying the location of the call. Also, the system 700 may display the footage in the application 422.

In an embodiment, the system 700 may select a call for dynamic routing. Driving directions may be shown from the FR's 104 current location to the caller's current location and they will be dynamically updated as the locations change. In an embodiment, the system 700 may mark that the FR 104 is responding to a call. This may be displayed on the map by displaying the units in a different color and/or shape.

In one embodiment, the system 700 may display the drone 132 as a First Responder (DFR) position if the drone 132 had been launched. The FR 104 may be able to click on the drone's 132 position pin on the map to open an additional window that would show the video being captured by the drone 132. The FR 104 may not have control over the drone 132, however they would only be getting the video stream as it occurs.

In one embodiment, some additional controls and functionality may be provided to allow the FR 104 to view the video only if they were stationary, to prevent distraction while driving.

In one embodiment, the drone 132 may be able to provide streaming of information about the emergency call, such as in the form of a streaming video or image application, to the FR 104.

Figure 8:
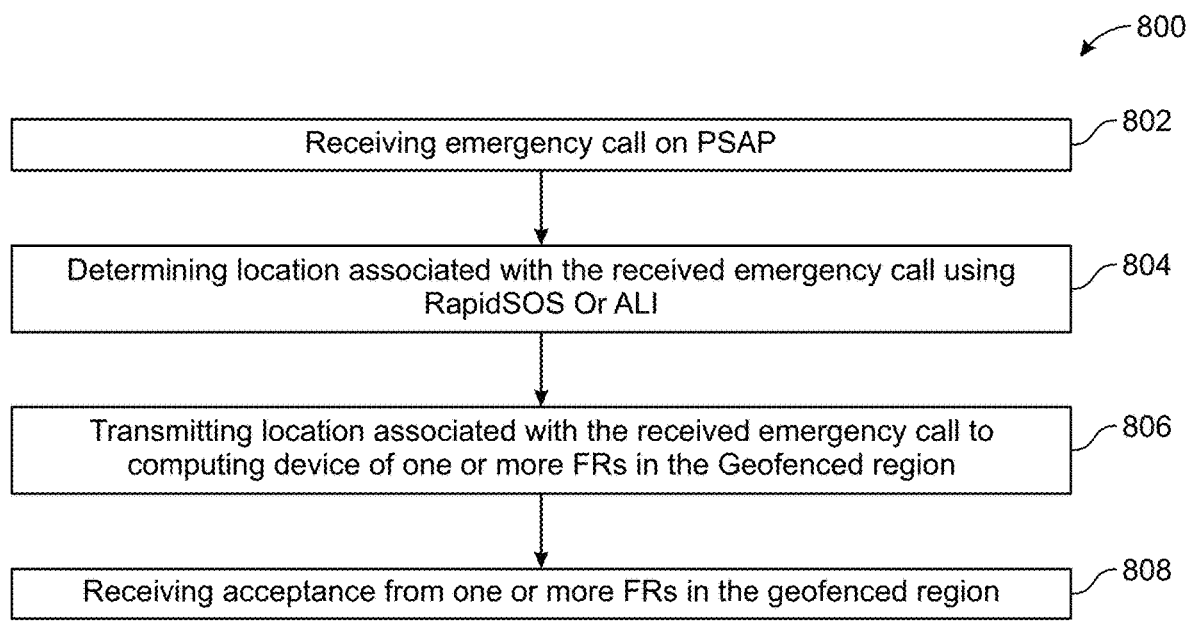
FIG. 8 illustrates a flow diagram of working of an apparatus for live streaming emergency call data to the one or more FRs in the field, in accordance with an embodiment of the invention.

FIG. 8 illustrates a flow diagram of working of the system 100 for live streaming emergency call data to first responders in the field, in accordance with an embodiment of the invention. It will be understood that each block of the flow diagram of the method 800 may be implemented by various means, such as hardware, firmware, processor, circuitry, and/or other communication devices associated with the execution of software including one or more computer program instructions. For example, one or more of the procedures described above may be embodied by computer program instructions. In this regard, the computer program instructions which embody the procedures described above may be stored by a memory of the system, employing an embodiment of the present invention and executed by a processor. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

At step 802, the system 100 may receive an emergency call on PSAP. The emergency call may be associated with any person in need of help. That may be related to medical help, or domestic help, accident-related help, and the like. At step 804, after receiving the call, the system 100 may determine the location associated with the received emergency call using emergency response data, ALI data, GPS data, or a combination thereof associated with the incoming emergency call. The emergency response data may be RapidSOS® data. At step 806, the system 100 may transmit location associated with the received emergency call to the computing device of one or more FRs in the geofenced region. At step 808, the system 100 may receive acceptance from one or more FRs in the geofenced region, and the assistance is provided by the FR.

Figure 9:
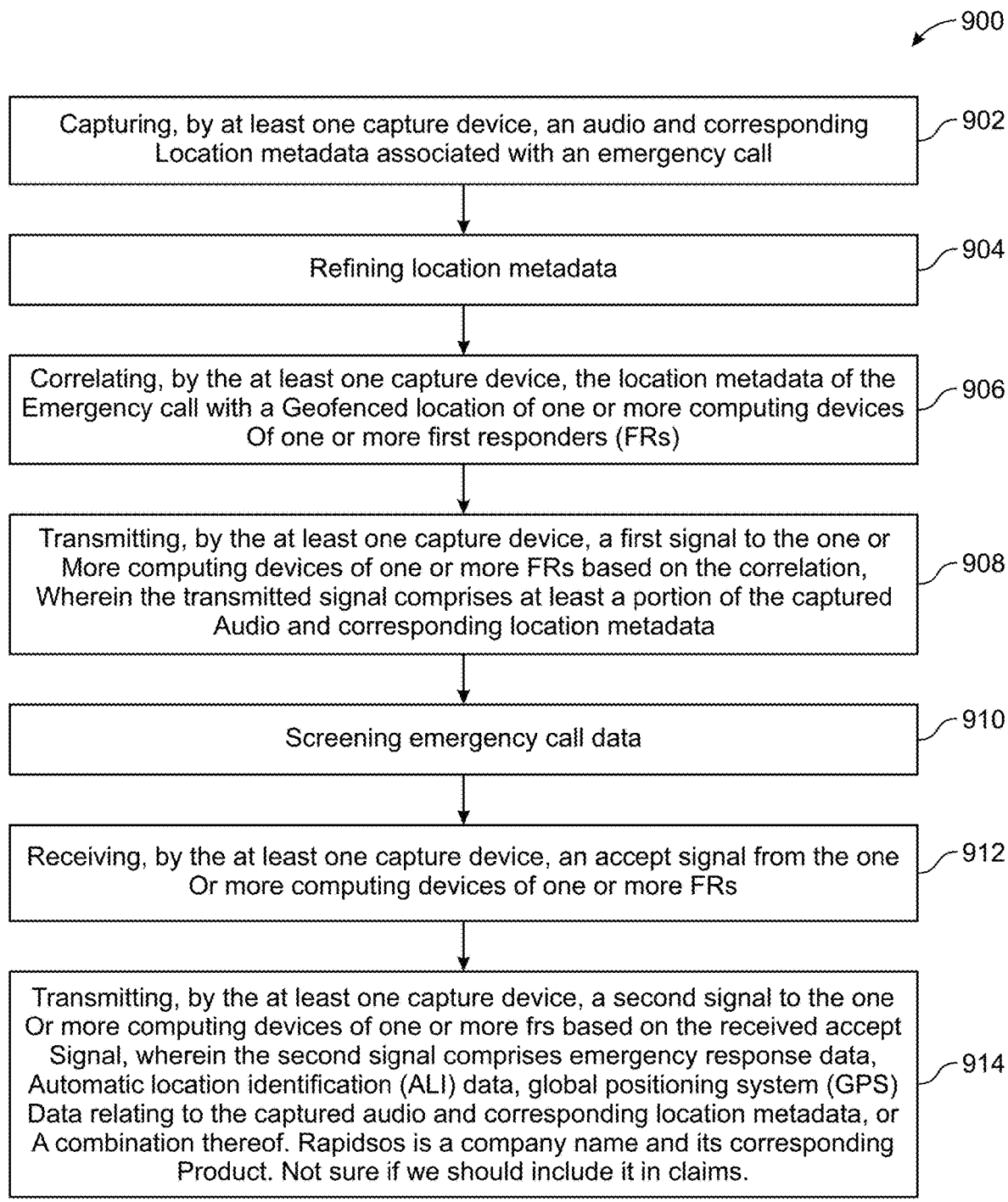
FIG. 9 illustrates a flow diagram of a system for live streaming emergency call data to the one or more FRs in the field, in accordance with an embodiment of the invention.

FIG. 9 illustrates a flow diagram of a system 900 for live streaming emergency call data to first responders in the field, in accordance with an embodiment of the invention. It will be understood that each block of the flow diagram of the method 900 may be implemented by various means, such as hardware, firmware, processor, circuitry, and/or other communication devices associated with the execution of software including one or more computer program instructions. For example, one or more of the procedures described above may be embodied by computer program instructions. In this regard, the computer program instructions which embody the procedures described above may be stored by a memory of the system, employing an embodiment of the present invention and executed by a processor. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

At step 902, the method 900 comprises capturing, by at least one capture device, an audio and corresponding location metadata associated with an emergency call.

At step 904, the method 900 comprises refining the location metadata, to provide refined location metadata. The refined location metadata may include more precise location metadata, such as one or more street addresses associated with the emergency call. This refined location metadata may be obtained by sending additional queries to a RapidSOS® like data clearinghouse, and even more precise street address may be obtained by means of additional queries to an ArcGIS® like geocoding service.

At step 906, the method 900 comprises, correlating, by the at least one capture device, the refined location metadata of the emergency call with a geofenced location of one or more computing devices of one or more first responders (FRs), such as the computing device 106 of the FR 104.

At step 908, the method 900 comprises transmitting, by the at least one capture device, a first signal to the one or more computing devices of one or more FRs based on the correlation, wherein the transmitted signal comprises at least a portion of the captured audio and corresponding refined location metadata. The refined location metadata may include such as street addresses associated with the incoming emergency call.

At step 910, the method 900 comprises screening the emergency call metadata. The screening may be done by any of the computing device 106 or the capture device 114. The purpose of screening is to filter the emergency call metadata so that only those emergency calls may be selected for response which are either of interest, or relevance, the one or more FRs 104. This further helps in reducing distractions and cognitive load experienced by the one or more FRs 104.

At step 912, the method 900 comprises receiving, by the at least one capture device, an accept signal from the one or more computing devices 106 of one or more FRs 104. The accept signal is received in response to screening of the emergency call metadata done previously. At step 914, the method 900 comprises transmitting, by the at least one capture device 114, a second signal to the one or more computing devices 106 of one or more FRs 104 based on the received accept signal, wherein the second signal comprises emergency response data, Automatic Location Identification (ALI) data, global positioning system (GPS) data relating to the captured audio and corresponding refined location metadata, or a combination thereof.

In one embodiment, the one or more FRs 104 can identify the emergency caller, their requirement, their location and time to reach them based on all the data transmitted by the at least one capture device 114. This helps in saving a lot of time in responding to the emergency calls by the suitable FR 104.

Figure 10:
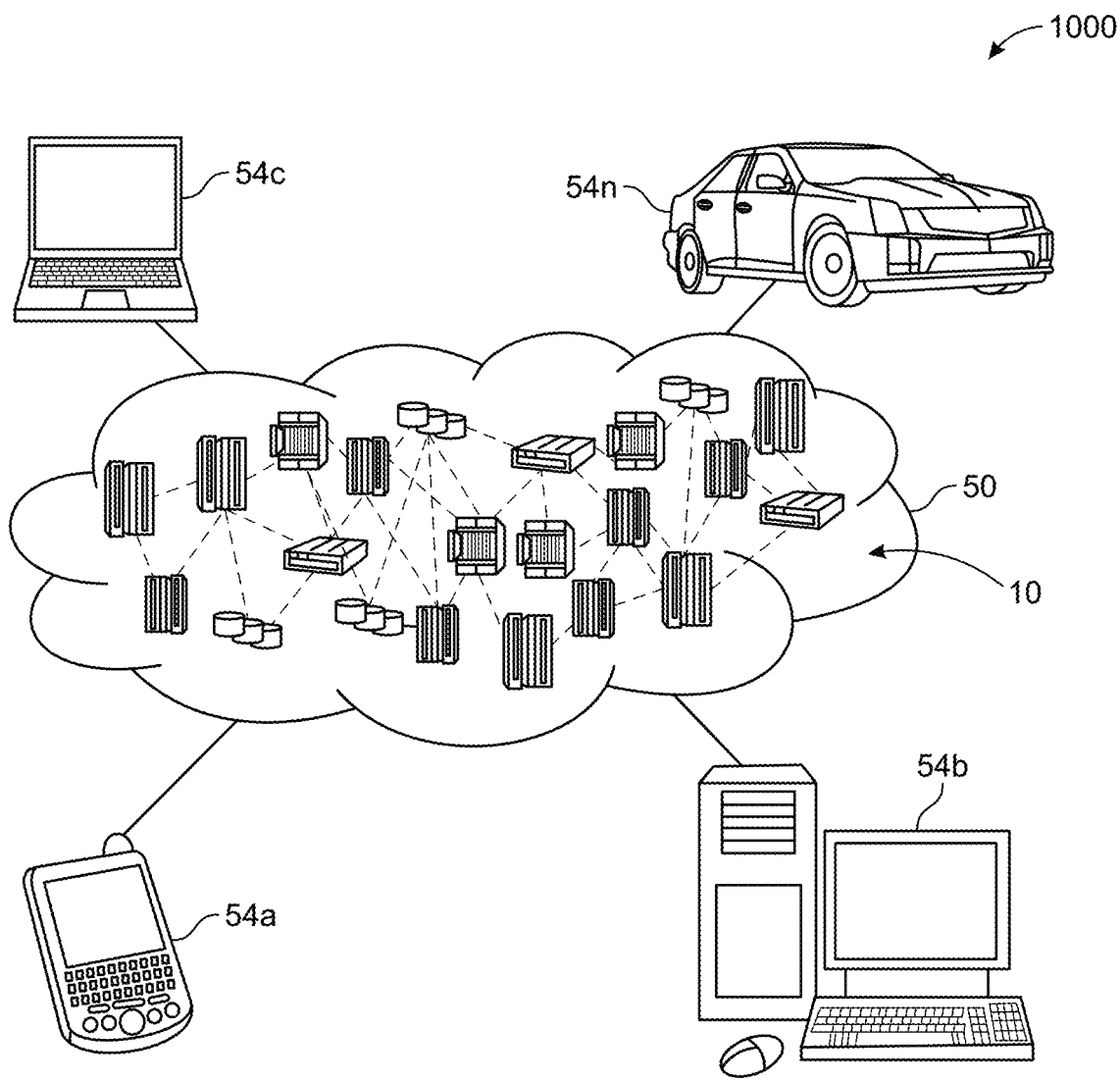
FIG. 10 depicts a cloud computing environment for implementing an embodiment of the system and process disclosed herein, in accordance with an embodiment of the invention.

FIG. 10 depicts a cloud computing environment 1000 for implementing an embodiment of the system and process disclosed herein, in accordance with an embodiment of the invention. As shown, cloud computing environment 50 comprises one or more cloud computing nodes 10 with which local computing devices used by cloud consumers, such as, for example, personal digital assistant (PDA), smartphone, smartwatch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser). Cloud computing environments are offered by Amazon, Microsoft and Google. On premises Virtualized environments may also be used, such as VMWare or Hyper-V.

It is contemplated that various combinations and/or subcombinations of the specific features and aspects of the above embodiments may be made and still fall within the scope of the invention. Accordingly, various features and aspects of the disclosed embodiments may be combined with or substituted for one another in order to form varying modes of the disclosed invention. Further, it is intended that the scope of the present invention is herein disclosed by way of examples and should not be limited by the disclosed embodiments described above.

What is claimed is:

1. A method comprising:
capturing, by at least one capture device, an audio and corresponding location metadata associated with an emergency call, wherein the location metadata comprises a location of a caller of the emergency call, and wherein the at least one capture device is secured within a Public Safety Answering Point (PSAP);
refining, by at least one capture device, the location metadata to provide a refined location metadata, wherein the refined location metadata comprises one or more street addresses;
correlating, by the at least one capture device, the refined location metadata of the emergency call with a geofenced location of one or more computing devices of one or more first responders (FRs);
transmitting, by the at least one capture device, a first signal to the one or more computing devices of one or more FRs based on the correlation, wherein the transmitted first signal comprises at least a portion of a live stream of the captured audio and corresponding refined location metadata;
screening, by at least one of the at least one capture device and the at least one computing device, the emergency call metadata, wherein screening comprises filtering the emergency call metadata to select only emergency calls of interest or relevance to the one or more computing devices of one or more FRs;
receiving, by the at least one capture device, an accept signal from the one or more computing devices of one or more FRs based on the screening; and
transmitting, by the at least one capture device, a second signal to the one or more computing devices of one or more FRs based on the received accept signal, wherein the second signal comprises at least one of: an emergency response data, an Automatic Location Identification (ALI) data, and a global positioning system (GPS) data relating to the captured audio and corresponding refined location metadata;
wherein emergency calls with the location metadata outside the geofenced location but within a predetermined distance from the geofenced location are streamed to the at least one computing device regardless of filtering by the at least one computing device.

2. The method of claim 1, further comprising:
measuring, by the one or more computing devices of one or more FRs, an actual time spent in monitoring of the emergency call by the one or more computing devices of one or more FRs and transmitting this measurement to the at least one capture device for reporting and statistical analysis.

3. The method of claim 1, wherein correlating further comprising:
determining, by the at least one capture device, that the refined location metadata of the emergency call is within the geofenced location of one or more computing devices of one or more first responders (FRs) for the correlation.

4. The method of claim 3, further comprising:
receiving, by the one or more computing devices of the one or more FRs the first signal; and
sending, by the one or more computing devices of the one or more FRs, the accept signal to the capture device.

5. The method of claim 1, wherein correlating further comprising:

determining, by the at least one capture device, that the refined location metadata of the emergency call is within a predetermined distance threshold from the geofenced location of one or more computing devices of one or more first responders (FRs) for the correlation.

6. The method of claim 5, further comprising:
receiving, by the one or more computing devices of the one or more FRs the first signal; and
sending, by the one or more computing devices of the one or more FRs, the accept signal to the capture device.

7. The method of claim 1, further comprising:
monitoring duplicate call associated with the emergency call.

8. The method of claim 1, further comprising:
displaying, on a graphical user interface (GUI) of the one or more computing devices of the one or more FRs, a map comprising at least one of a location history associated with the emergency call and a current location associated with the emergency call.

9. The method of claim 1, further comprising:
providing, by a drone, a geofencing range associated with the geofenced location of one or more computing devices of one or more first responders (FRs).

10. The method of claim 1, further comprising:
determining the location associated with the emergency call based on the GPS location associated with a callback to emergency number.

11. An apparatus comprising:
at least one memory;
at least one processor configured to execute instructions stored in the at least one memory in order to:
capture an audio and corresponding location metadata associated with an emergency call, wherein the location metadata comprises a location of a caller of the emergency call, and wherein the at least one capture device is secured within a Public Safety Answering Point (PSAP);
refine the location metadata to provide a refined location metadata, wherein the refined location metadata comprises one or more street addresses;
correlate the refined location metadata of the emergency call with a geofenced location of one or more computing devices of one or more first responders (FRs);
transmit a first signal to the one or more computing devices of one or more FRs based on the correlation, wherein the transmitted first signal comprises at least a portion of a live stream of the captured audio and corresponding refined location metadata;
screen the emergency call metadata, wherein screening comprises filtering the emergency call metadata to select only emergency calls of interest or relevance to the one or more computing devices of one or more FRs;
receive an accept signal from the one or more computing devices of one or more FRs based on the screening; and
transmit a second signal to the one or more computing devices of one or more FRs based on the received accept signal, wherein the second signal comprises at least one of: an emergency response data, and Automatic Location Identification (ALI) data, and a global positioning system (GPS) data relating to the captured audio and corresponding refined location metadata;
wherein emergency calls with the location metadata outside the geofenced location but within a predetermined distance from the geofenced location are streamed to the at least one computing device regardless of filtering by the at least one computing device.

12. The apparatus as in claim 11, wherein the at least one processor is further configured to execute the instructions to:
receive a measurement of an actual time spent in monitoring of the emergency call by the one or more computing devices of one or more FRs for reporting and statistical analysis.

13. The apparatus as in claim 11, wherein to correlate the processor is further configured to: determine that the refined location metadata of the emergency call is within the geofenced location of one or more computing devices of one or more first responders (FRs) for the correlation.

14. The apparatus as in claim 13, wherein the processor is further configured to: receive the accept signal from the one or more computing devices of the one or more FRs.

15. The apparatus as in claim 11, wherein to correlate, the processor is further configured to: determine that the refined location metadata of the emergency call is within a predetermined distance threshold from the geofenced location of one or more computing devices of one or more first responders (FRs) for the correlation.

16. The apparatus as in claim 15, wherein the processor is further configured to: receive the accept signal from the one or more computing devices of the one or more FRs.

17. The apparatus as in claim 11, wherein the processor is further configured to: monitor duplicate calls associated with the emergency call.

18. A computer programmable product comprising a non-transitory computer readable medium having stored thereon computer executable instruction which when executed by one or more processors, cause the one or more processors to carry out operations, the operations comprising:
capturing an audio and corresponding location metadata associated with an emergency call, wherein the location metadata comprises a location of a caller of the emergency call, and wherein the at least one capture device is secured within a Public Safety Answering Point (PSAP);
refining the location metadata to provide a refined location metadata, wherein the refined location metadata comprises one or more street addresses;
correlating the refined location metadata of the emergency call with a geofenced location of one or more computing devices of one or more first responders (FRs);
transmitting a first signal to the one or more computing devices of one or more FRs based on the correlation, wherein the transmitted first signal comprises at least a portion of a live stream of the captured audio and corresponding refined location metadata;
screening the emergency call metadata, wherein screening comprises filtering the emergency call metadata to select only emergency calls of interest or relevance to the one or more computing devices of one or more FRs;
receiving an accept signal from the one or more computing devices of one or more FRs based on the screening;
transmitting a second signal to the one or more computing devices of one or more FRs based on the received accept signal, wherein the second signal comprises emergency response data, Automatic Location Identification (ALI) data, global positioning system (GPS) data relating to the captured audio and corresponding refined location metadata, or a combination thereof;

wherein emergency calls with the location metadata outside the geofenced location but within a predetermined distance from the geofenced location are streamed to the at least one computing device regardless of filtering by the at least one computing device.

19. The computer programmable product of claim 18, wherein the operations further comprising:
receiving a measurement of an actual time spent in monitoring of the emergency call by the one or more computing devices of one or more FRs for reporting and statistical analysis.

20. The computer programmable product of claim 18, wherein correlating further comprising:
determining that the refined location metadata of the emergency call is within the geofenced location of one or more computing devices of one or more first responders (FRs) for the correlation.

* * * * *